United States Patent
Payne et al.

(10) Patent No.: US 6,449,599 B1
(45) Date of Patent: *Sep. 10, 2002

(54) NETWORK SALES SYSTEM

(75) Inventors: Andrew C. Payne, Lincoln; Lawrence C. Stewart, Burlington, both of MA (US); David J. Mackie, Brookdale, CA (US)

(73) Assignee: Open Market, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,723

(22) Filed: May 4, 1999

Related U.S. Application Data

(63) Continuation of application No. 08/878,396, filed on Jun. 18, 1997, now Pat. No. 5,909,492, which is a continuation of application No. 08/328,133, filed on Oct. 24, 1994, now Pat. No. 5,715,314.

(51) Int. Cl.[7] .............................................. G06F 17/60

(52) U.S. Cl. .......................................... 705/27; 705/26

(58) Field of Search .............................. 705/27, 25, 26, 705/1; 380/4, 24, 25

(56) References Cited

U.S. PATENT DOCUMENTS

| | | | |
|---|---|---|---|
| 4,305,059 A | 12/1981 | Benton | 340/825.33 |
| 4,528,643 A | 7/1985 | Freeny, Jr. | |
| 4,529,870 A | 7/1985 | Chaum | |
| 4,578,530 A | 3/1986 | Zeidler | 178/22.09 |
| 4,734,858 A | 3/1988 | Schlafly | 364/408 |
| 4,755,940 A | 7/1988 | Brachtl et al. | 364/408 |

(List continued on next page.)

FOREIGN PATENT DOCUMENTS

| | | | |
|---|---|---|---|
| EP | 0 172 670 | 2/1986 | |
| EP | 0-542-298 A2 | 5/1993 | |
| GB | 2102606 | 2/1983 | |
| JP | 4-10191 | 1/1992 | ................. 705/26 |
| JP | 05-158963 | 6/1993 | |
| WO | WO 91/16691 | 10/1991 | |
| WO | WO 93/10503 | 5/1993 | ........... G06F/15/30 |

OTHER PUBLICATIONS

Anon., Newsbytes News Network, "Electronic Book Helps Put Documentation on Internet," Jun. 21, 1994.*

Burke, R.R., "The Virtual Store: A New Tool for Consumer Research," Stores, vol. 76, No. 8, pp. RR1–RR3, Aug. 1994.*

P. Remeery et al., "Le Paiement electronique", pp. 15–23, 1988, *L'Echo des RECHERCHES*, No. 134.

(List continued on next page.)

*Primary Examiner*—Wynn Coggins
*Assistant Examiner*—Nicholas David Rosen
(74) *Attorney, Agent, or Firm*—Bell, Boyd & Lloyd LLC

(57) ABSTRACT

A network-based sales system includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

23 Claims, 25 Drawing Sheets

U.S. PATENT DOCUMENTS

| | | |
|---|---|---|
| 4,759,063 A | 7/1988 | Chaum |
| 4,759,064 A | 7/1988 | Chaum |
| 4,775,935 A | 10/1988 | Yourick ................... 364/401 |
| 4,795,890 A | 1/1989 | Goldman ................. 235/380 |
| 4,799,156 A | 1/1989 | Shavit et al. ............. 364/401 |
| 4,812,628 A | 3/1989 | Boston et al. ............ 235/380 |
| 4,827,508 A | 5/1989 | Shear ........................ 380/4 |
| 4,891,503 A | 1/1990 | Jewel |
| 4,922,521 A | 5/1990 | Krikke et al. ............... 379/95 |
| 4,926,480 A | 5/1990 | Chaum |
| 4,935,870 A | 6/1990 | Burk, Jr. et al. ........... 364/200 |
| 4,947,028 A | 8/1990 | Gorog ....................... 235/381 |
| 4,947,430 A | 8/1990 | Chaum |
| 4,949,380 A | 8/1990 | Chaum |
| 4,972,318 A | 11/1990 | Brown et al. |
| 4,977,595 A | 12/1990 | Ohta et al. ................. 380/24 |
| 4,982,346 A | 1/1991 | Girouard et al. .......... 364/550 |
| 4,987,593 A | 1/1991 | Chaum |
| 4,991,210 A | 2/1991 | Chaum |
| 4,992,940 A | 2/1991 | Dworkin .................. 364/401 |
| 4,996,711 A | 2/1991 | Chaum |
| 5,025,373 A | 6/1991 | Keyser, Jr. et al. ........ 364/408 |
| 5,060,153 A | 10/1991 | Nakagawa ................. 364/405 |
| 5,077,607 A | 12/1991 | Johnson et al. ............ 358/86 |
| 5,105,184 A | 4/1992 | Pirani et al. |
| 5,220,501 A | 6/1993 | Lawlor et al. ............. 364/408 |
| 5,247,575 A | 9/1993 | Sprague et al. .............. 380/9 |
| 5,276,736 A | 1/1994 | Chaum |
| 5,305,195 A | 4/1994 | Murphy .................... 364/401 |
| 5,311,594 A | 5/1994 | Penzias ..................... 380/24 |
| 5,319,542 A | 6/1994 | King, Jr. et al. |
| 5,321,751 A | 6/1994 | Ray et al. .................. 380/24 |
| 5,336,870 A | 8/1994 | Hughes ..................... 235/379 |
| 5,341,429 A | 8/1994 | Stringer et al. ............ 380/23 |
| 5,347,632 A | 9/1994 | Filepp et al. .............. 395/200 |
| 5,351,186 A | 9/1994 | Bullock et al. ............ 364/401 |
| 5,351,293 A | 9/1994 | Michener et al. .......... 380/21 |
| 5,383,113 A | 1/1995 | Kight et al. ............... 364/401 |
| 5,414,833 A | 5/1995 | Hershey et al. ........... 395/575 |
| 5,475,585 A | 12/1995 | Bush ........................ 705/26 |
| 5,521,631 A | 5/1996 | Budow et al. |
| 5,535,229 A | 7/1996 | Hain, Jr. et al. |
| 5,557,516 A | 9/1996 | Hogan ...................... 364/406 |
| 5,557,518 A | 9/1996 | Rosen ....................... 380/24 |
| 5,557,798 A | 9/1996 | Skeen et al. |
| 5,590,197 A | 12/1996 | Chen et al. ................. 380/24 |
| 5,592,378 A | 1/1997 | Cameron et al. |
| 5,594,910 A | 1/1997 | Filepp et al. |
| 5,596,642 A | 1/1997 | Davis et al. ................ 380/24 |
| 5,596,643 A | 1/1997 | Davis et al. ................ 380/24 |
| 5,604,802 A | 2/1997 | Holloway .................. 380/24 |
| 5,621,797 A | 4/1997 | Rosen ....................... 380/24 |
| 5,623,547 A | 4/1997 | Jones et al. ................ 380/24 |
| 5,642,419 A | 6/1997 | Rosen ....................... 380/24 |
| 5,664,110 A * | 9/1997 | Green et al. ............... 705/26 |
| 5,664,111 A * | 9/1997 | Nahan et al. ............... 705/27 |
| 5,694,551 A | 12/1997 | Doyle et al. |
| 5,715,314 A | 2/1998 | Payne et al. ................ 380/24 |
| 5,724,424 A * | 3/1998 | Gifford ..................... 705/79 |
| 5,727,164 A * | 3/1998 | Kaye et al. ................. 705/28 |
| 5,734,719 A | 3/1998 | Tsevdos et al. ............ 700/234 |
| 5,826,241 A | 10/1998 | Stein et al. ................. 705/26 |
| 5,848,399 A * | 12/1998 | Burke ........................ 705/27 |
| 5,897,622 A * | 4/1999 | Blinn et al. ................ 705/26 |
| 5,909,492 A * | 6/1999 | Payne et al. ............... 340/24 |
| 5,920,847 A | 7/1999 | Kolling et al. |
| 6,006,199 A * | 12/1999 | Berlin et al. ............... 705/26 |

OTHER PUBLICATIONS

CCITT Blue Book, vol. VIII; pp. 48–81, Nov. 14–25, 1988.

Rafael Hirschfeld, "Making Electronic Refunds Safer"; Sections 1, 2, 4 and 6, 1992.

Low et al., "Anonymous Credit Cards", pp. 1–16.

Lai et al., "Endorsements, Licensing, and Insurance for Distributed System Services", Information Sciences Institute Univ. of Southern CA., Assoc. for Computing Machinery 1994.

Allen & Hamilton, How to Buy information with a First Virtual Account, Apr. 11, 1994, pp. 3–71.

"Advanced Electronic Credit Authorization Through the Amherst Group SNET", News Release, pp. 1–2.

Computer Fraud & Security Bulletin, "Underlying Security Mechanisms," Mar. 1997.

Abadi, M. et al.; "Authentication and Delegation with Smart–Cards" Report 67; Systems Research Center; Digital Equipment Corporation; Palo Alto, California; Oct. 22, 1990, revised Jul. 30, 1992.

American National Standard; "Financial Institution Retail Message Authentication"; ANSI X9.19; 1986.

American National Standard; "Interchange Message Specification for Debit and Credit Card Message Exchange Among Financial institutions"; ANSI X9.2; 1988.

Anderson, Ross J.; "UEPS—A Second Generation Electronic Wallet"; Proc. of the Second European Symposium on Research in Computer Security (ESORICS); Touluse, France; pp. 411–418; Nov., 1992.

Anderson, Ross ; "Why Cryptosystems Fail"; Proc. 1st Conf. Computer and Comm. Security; pp. 215–227; Nov., 1993.

Bank Administration Institute; *Payment Systems in Eleven Developed Countries;* "United States"; pp. 215–235; 1989.

Batelann; Butler; Chan; Chen; Evenchick; Hughes; Jen; Jeng; Millett; Riccio; Skoudis; Starace; Stoddard; "An Internet Billing Server Prototype Design"; Carnegie Mellon University; 1992.

Batelaan; Butler; Chan; Chen; Evenchick; Hughes; Jen; Jeng Millett; Riccio; Skoudis; Starace; Stoddard;

"An Internet Billing Server: System Requirements"; Carnegie Mellon University; Master of Science thesis; 1992.

Bellcore Internal E–Mail, Nov. 24, 1993.

Bender, M.; "EFTS: Electronic Funds Transfer Systems"; Kennikat Press; Port Washington, New York; pp. 43–46; 1975.

Bodner; Carlos; Evans; Garcia; Ha; Harris; Reece; Russo; Sekino; Walker; "An Internet Billing Server: Analysis of Distributed Computing and Cross Platform Issues"; Carnegie Mellon University; thesis; 1993.

Bodner; Carlos; Evans; Garcia; Ha; Harris; Reece; Russo; Sekino; Walker; "An Internet Billing Server: Availability, Reliability & Scalability Issues in the MS4 Billing Server Design & Prototype"; thesis; 1993.

Bodner; Carlos; Evans; Garcia; Ha; Harris; Reece; Russo; Sekino; Walker; "The Internet Billing Server: Design Document"; Carnegie Mellon University Information Networking Institute; Master of Science thesis; 1993.

Bodner; Carlos; Evans; Garcia; Ha; Harris; Reece; Russo; Sekino; Walker; "The Internet Billing Server: Prototype Requirements"; Carnegie Mellon University Information Networking Insititute; thesis; 1993.

Bos et al.; "SmartCash: A Practical Electronic Payment System"; pp. 1–8; Aug., 1990.

Bürk et al.; "Value Exchange Systems Enabling Security and Unobservability"; *Computers & Security*, 9; pp. 715–721; 1990.

Chaum et al.; "Achieving Electronic Privacy"; *Scientific American;* pp. 319–327; 1988.

Chaum, D.L. et al.; Implementing Capability–Based Protection Using Encryption; Electronics Research Laboratory, College of Engineering, University of California, Berkeley, California; Jul. 17, 1978.

Chaum et al.; "Untraceable Electronic Cash"; *Advances in Cryptology;* pp. 319–327; 1988.

Cohen, Danny; "Computerized Commerce"; ISI Reprint Series ISI/RS–89–243; Oct., 1989; Reprinted from Information Processing 89, Proceedings of the IFIP World Computer Congress, held Aug. 28–Sep. 1 1989.

Cohen, Danny; "Electronic Commerce"; University of Southern California, Information Sciences Institute, Research Report ISI/RR–89–244; Oct., 1989.

Compuserve International; Compuserve Information Service Users Guide; pp. 109–114; 1986.

Computer Shopper; "Internet for Profit"; pp. 180–182, 187, 190–192, 522–528, 532, 534; Nov., 1994.

Davies, D.W. and Price, W.L.; "Security for Computer Networks: An Introduction to Data Security in Teleprocessing and Electronic Funds Transfer"; John Wiley & Sons; Dec. 5, 1985; pp. 304–336.

Dukach, Semyon; "SNPP: A Simple Network Payment Protocol"; MIT Laboratory for Computer Science; Cambridge, Massachusetts; 1993.

Even et al.; "Electronic Wallet"; pp. 383–386; 1983.

Gifford, David and Spector, Alfred; "Case Study: The CIRRUS Banking Network"; Comm. ACM 8, 28' pp. 797–8078 Aug., 1985.

Gifford, David K.; "Cryptographic Sealing for Information Secrecy and Authentication"; Stanford University and Xerox Palo Alto Research Center; Communications of the ACM; vol. 25, No. 4; Apr., 1982.

Gifford, David; "Notes on Community Information Systems" NIT LCS TM–419; Dec., 1989.

Gligor, Virgil D. et al.; "Object Migration and Authentication"; IEEE Transactions of Software Engineering; vol. SE–5, No. 6; Nov., 1979.

Harty et al.; "Case Study: The VISA Transaction Processing System"; 1988.

Information Network Institute, Carnegie Mellon University; Internet Billing Server; Prototype Scope Document; Oct. 14, 1993.

Intel Corporation; Power Technology; Marketing Brochure.

International Organization for Standardization; "International Standard: Bank Card Originated Messages—Interchange Message Specifications—Content for Financial Transactions"; ISO 8583; 1987.

Intuit Corp Quicken User's Guide; "Paying Bills Electronically"; pp. 171–192; 1993.

Jansson, Lennart; "General Electronic Payment System"; 7th Proceedings of the International Conference on Computer Communication; pp. 832–837; 1985.

Krajewski, M. et al.; "Applicability of Smart Cards to Network User Authentication"; *Computing Systems;* vol. 7, No. 1; 1994.

Krajewski, M.; "Concept for a Smart Card Kerberos"; 15th National Computer Security Conference; Oct., 1992.

Krajewski, M.; "Smart Card Augmentation of Kerberos"; Privacy and Security Research Group Workshop on Network and Distributed System Security; Feb., 1993.

Lampson, Butler; Abadi, Martin; Burrows, Michael; and Wobber, Edward; "Authentication in Distributed Systems: Theory and Practice"; ACM Transactions on Computer Systems: vol. 10, No. 4; Nov., 1992; pp. 265–310.

Mak, Stephen; "Network Based Billing Server"; Carnegie Mellon University Information Networking Institute; Masters of Science thesis; 1991.

Medvinsky et al.; "Electronic Currency for the Internet"; *Electronic Markets;* pp. 30–31; Sep., 1993.

Medvinsky et al.; "NetCash: A Design for Practical Electronic Currency on the Internet"; Proc. 1st ACM Conf. on Comp. and Comm. Security; Nov., 1993.

Miller, S.P.; Neuman, B.C.; Schiller, J.I.; Saltzer, J.H.; "Kerberos Authentication and Authorization System"; Project Athena Technical Plan, Section E.2.1; Massachusetts Insittute of Technology; Oct., 1988.

Mosaic Communications Corp. press release; "Mosaic Communications Unveils Netwok Navigator and Server Software for the Internet"; Sep. 12, 1994.

Needham, Roger M. and Schroeder, Michael D.; "Using Encryption for Authentication in Large Networks of Computers"; Communications of the ACM; vol. 21, No. 12; Dec., 1978; pp. 993–999.

National Westminster Bank Group; "Clearing House Automated Payments System"; pp. 1–29

Needham, Roger M.; "Adding Capability Access to Conventional File Servers"; Xerox Palo Alto Research Center; Palo Alto, California.

Neuman, B. Clifford; "Proxy–Based Authorization and Accounting for Distributed Systems"; Proceedings of the International Conference on Distributed Computing Systems; May 25–28, 1993; Conf. 13; IEEE pp. 283–291.

Okamoto et al.; "Universal Electronic Cash"; pp. 324–337; 1991.

Pfitzmann et al.; "How to Break and Repair a 'Provably Secure' Untraceable Payment System"; pp. 338–350; 1991.

Rescorla, E. and Schiffman, A.; "The Secure HyperText Transfer Protocol"; Enterprise Integration Technologies; Jun., 1994.

Rivest, R.; "The MD5 Message–Digest Algorithm"; MIT Laboratory for Computer Science and RSA Data Security, Inc.; Apr., 1992.

Rivest, R.L. et al., "A Method for Obtaining Digital Signatures and Public–Key Cryptosystems," Laboratory for Computer Science, Massachusetts Institute of Technology, Cambridge, Massachusetts.

Schamüller–Bichl, I.; "IC–Cards in High–Security Applications"; Selected Papers from the Smart Card 2000 Conference; *Springer Verlag;* pp. 177–199; 1991.

Sirbu, Marvin A.; "Internet Billing Service Design and Prototype Implementation"; *An Internet Billing Server;* pp. 1–19; 1993.

Society for Worldwide Interbank Financial Telecommunications. S.C.; "A S.W.I.F.T. Overview".

Tenebaum, Jay M. and Schiffman, Allan M.; "Development of Network Infrastructure and Services for Rapid Acquisition"; adapted from a white paper submitted to DARPA by MCC in collaboration with EIT and ISI.

Vittal, J. "Active Message Processing: Messages as Messengers"; pp. 175–195; 1981.

Voydock, Victor et al.; "Security Mechanisms in High–Level Network Protocols"; *Computing Surveys*; vol. 15, No. 2; Jun., 1981.

Takei, "Videotex Information System and Credit System Connecting with MARS–301 of JNR," *Japanese Railway Engineering*, No. 94, Sep. 1985, pp. 9–11.

Pongratz, et al, "IC Cards in Videotex Systems," *Smart Card 2000*, 1989, pp. 179–186.

Waidner, et al, "Loss–Tolerance for Electronic Wallets," *Fault–Tolerant Computing: 20th International Symposium*, Jun. 1990, pp. 140–147.

Floch, *Privacy Protected Payments: An Implementation of a Transaction System*, Dec. 1988, pp. 1–28.

Beutelspacher, et al, "Payment Applications with Multifunctional Smart Cards," *Smart Card 2000: The Future of IC Cards*, Oct. 1987, pp. 95–101.

Tanaka, et al, "Untraceable Electronic Funds Transfer System," *Electronics and Communications in Japan*, 1989, pp. 47–54.

Perry, "Electronic Banking Goes to Market," *IEEE Spectrum*, Feb. 1988, pp. 46–49.

Hakola, et al, "A System for Automatic Value Exchange," *Proceedings—Fall Joint Computer Conference*, 1966, pp. 579–589.

"CompuServe Videotex Network Offers Marketing Research Service, Ad Test," *Marketing News*, Nov. 25, 1983 p. 21.

Fujioka, et al, "ESIGN: An Efficient Digital Signature Implementation for Smart Cards," *Advances in Cryptology–Eurocrypt '91*, Apr. 1991, pp. 446–457.

"Electronic In–Home Shopping: "Our Stores are Always Open", " *Chain Store Age Executive*, Mar. 1985, pp. 111, 116.

"Suddenly, Videotex is Finding an Audience," *Business Week*, Oct. 19, 1987, pp. 92–94.

Staskauskas, "The Formal Specification and Design of a Distributed Electronic Funds Transfer System," *IEEE Transactions on Computers*, Dec. 1998, pp. 1515–1528.

Stol, *Privacy Protected Payments–A Possible Structure for a Real Implementaiton and Some Resource Considerations*, Feb. 1998.

Ph. van Heurck, "TRASEC: Belgian Security System for Electronic Funds Transfers," *Computers & Security*, 1987, pp. 261–268.

Weber, "Controls in Electronic Funds Transfer System," *Computers & Security*, 1989, pp. 209–221.

Shain, "Security in Electronic Funds Transfer System," *Computers & Security*, 1989, pp. 123–137.

Burk, et al, "Digital Payment Systems Enabling Security and Observability," *Computers & Security*, 1989, pp. 399–415.

Andrade, et al, "Open On–Line Transaction Processing with the Tuxedo System," *COMPCON* Spring 1992, Feb. 1992, pp. 366–371.

Damgard, "Payment Systems and Credential Mechanisms with Provable Security Against Abuse by Individuals," *Advances in Cryptology—CRYPTO '88*, 1988, pp. 328–325.

Tunstall, "Electronic Currency," *Smart Card 2000: The future of IC Cards*, Oct. 1987, pp. 47–48.

Strazewski, "Computerized Service Sets Shoppers Hacking," *Advertising Age*, Feb. 22, 1988, p. 62.

Messmer, "NIST Stumbles on Proposal for Public Key Encryption," *Network World*, Jul. 27, 1992, p. 1.

Knapskog, Privacy Protected Payments– Realization of a Protocol That Guarantees Payor Anonymity, *Advances in Cryptology–Eurocrypt '88*, May 1988, pp. 107–122.

"Redcoats Join Communications Fight." *Industry Week*, Feb. 22, 1982, pp. 108–109.

Williams, "Debit Program Cuts Fraud; CompuServe Plan a Success," *Pensions & Investment Age*, Feb. 4, 1985, pp. 21–32.

Consumers Plugging Into New Electronic Mall, *Advertising Age*, Mar. 4, 1985. p. 74.

"Taking Advantage of the Past," *Advertising Age*, Apr. 11, 1983, pp. M36–37.

"Mall Offers Holiday Treat for Hackers," *Advertising Age*, Nov. 13, 1985, p. 76.

Kenny, "EDI Security: Risks and Solutions," *COMPSEC 1992; The Ninth World Conference on Computer Security, Audit, and Control*, Nov. 1992, pp. 341–352.

Ferrarini, "Direct Connections for Software Selections," *Business Computer Systems*, Feb. 1984, pp. 35–38.

P. Rémery et al., "Le paiement électronique", pp. 15–23, 1988, *L'Écho des RECHERCHES*, No. 134.

CCITT Blue Book, vol. VIII; pp. 48–81, Nov. 14–25, 1988.

* cited by examiner

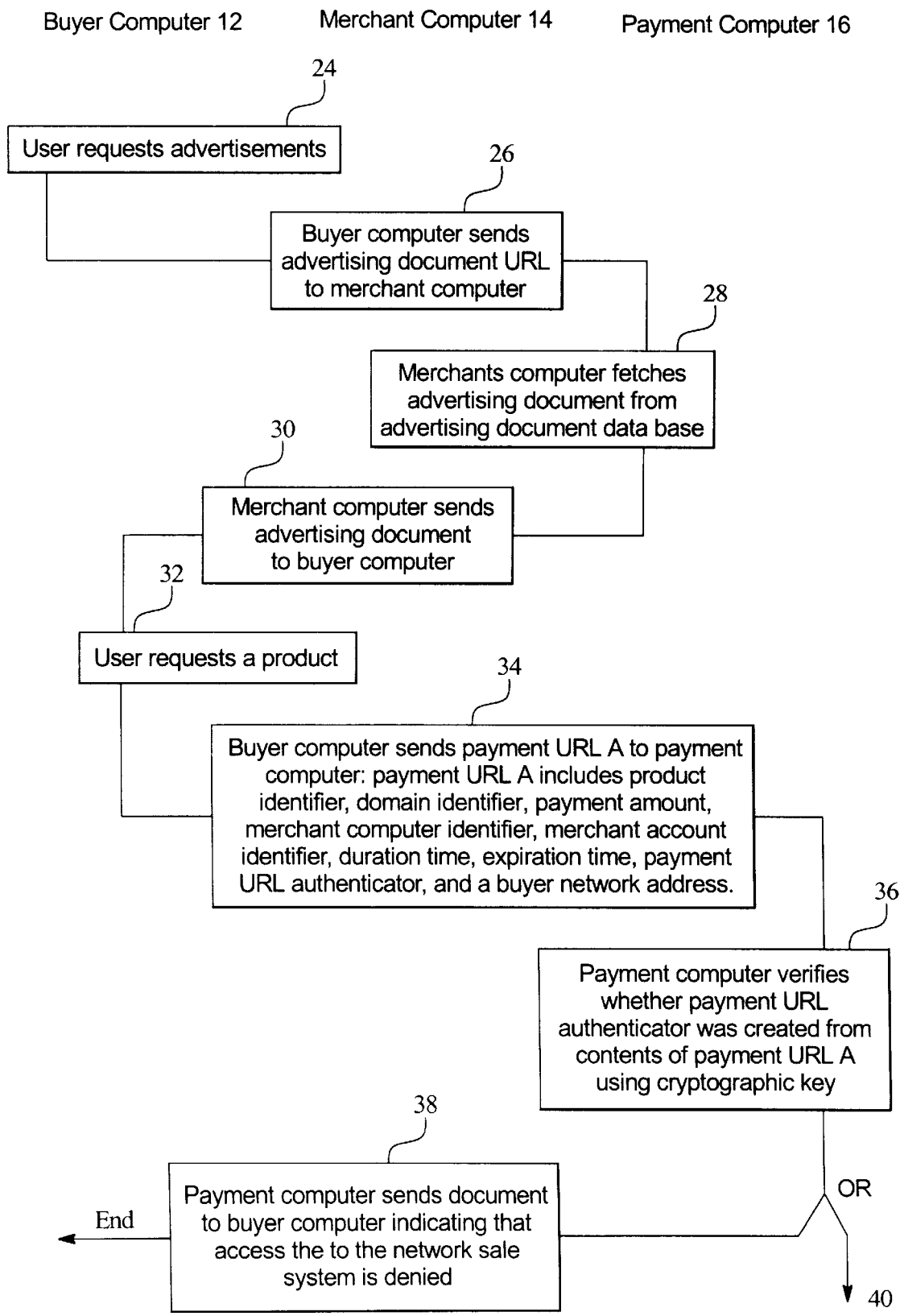

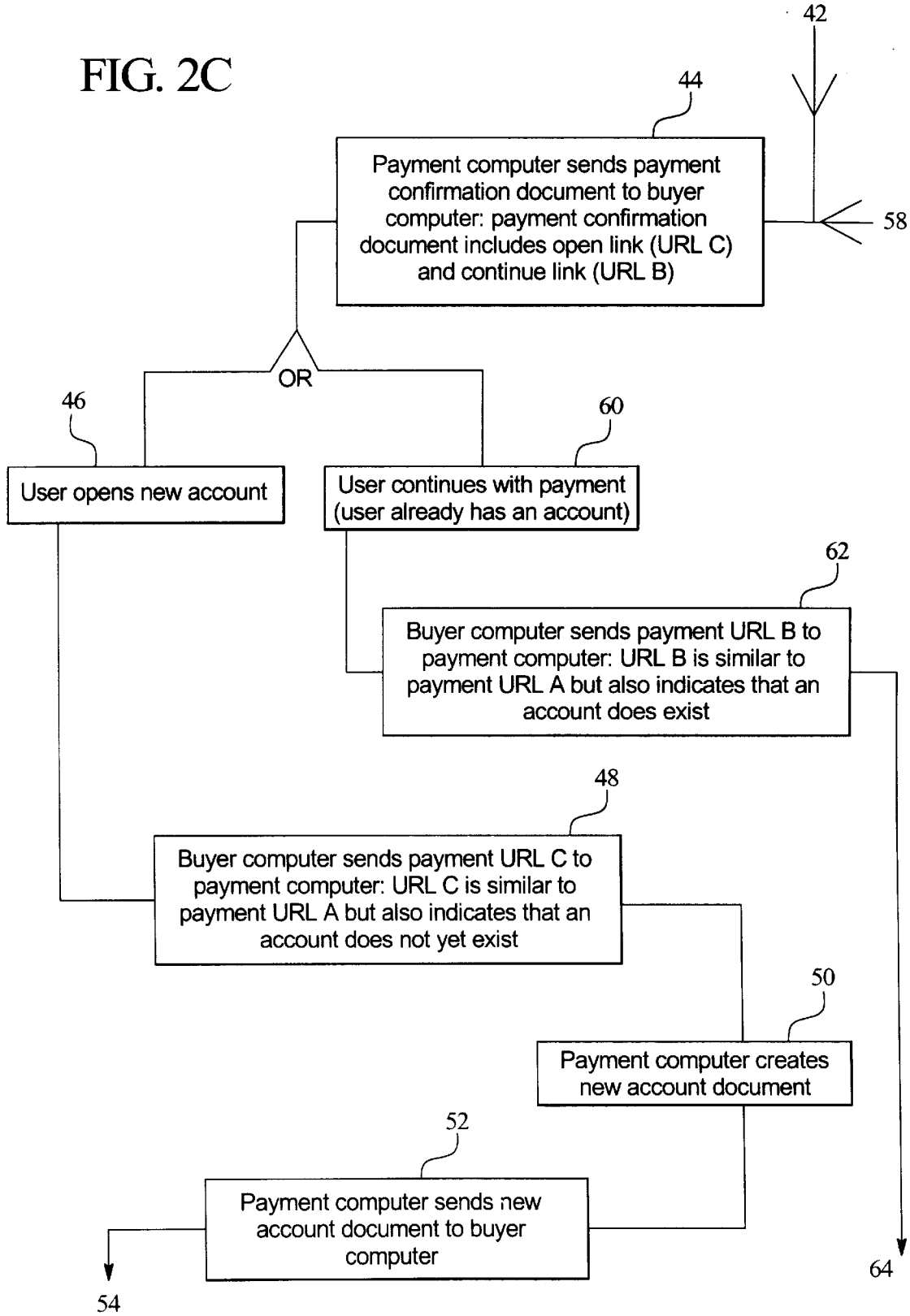

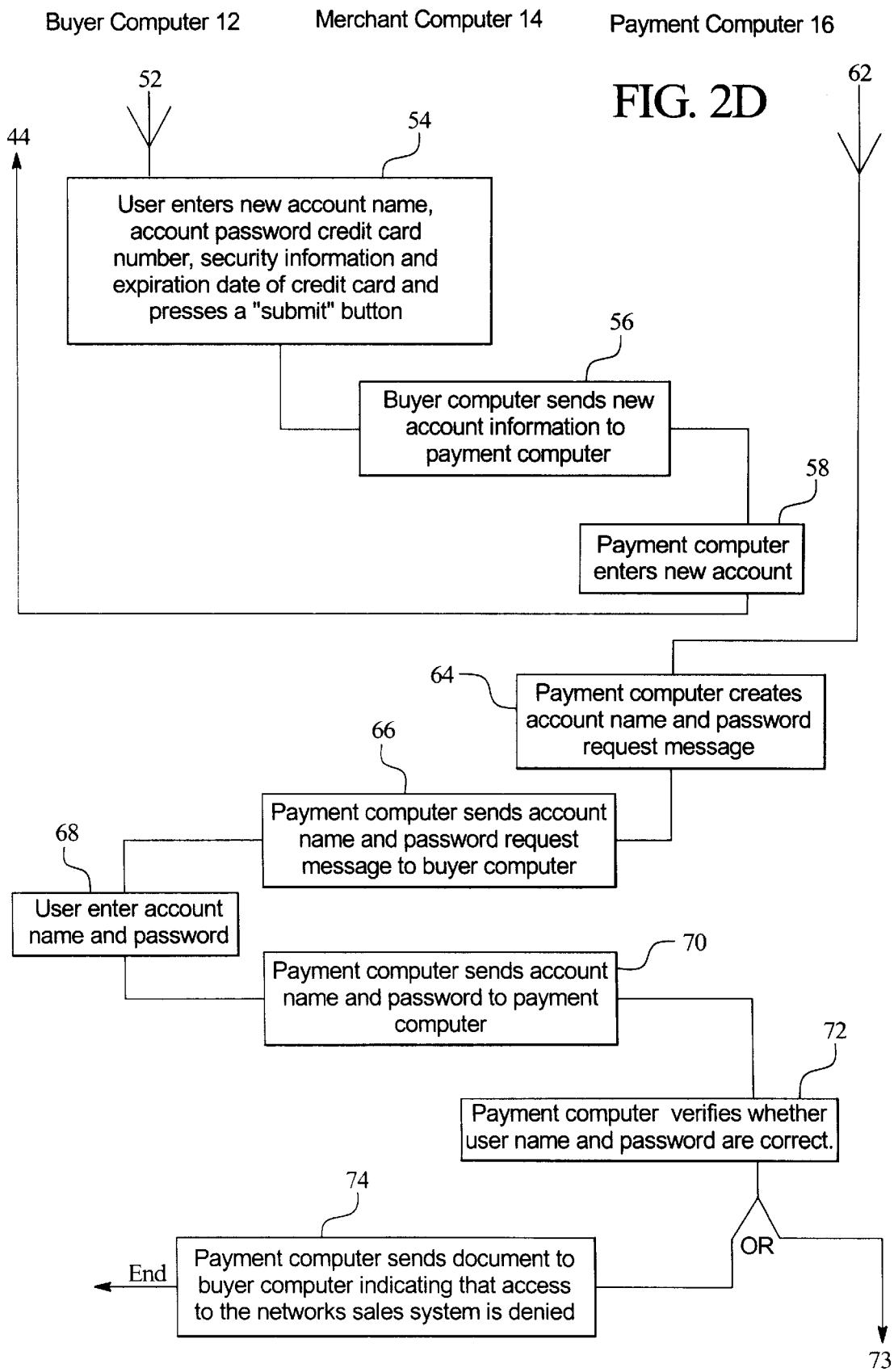

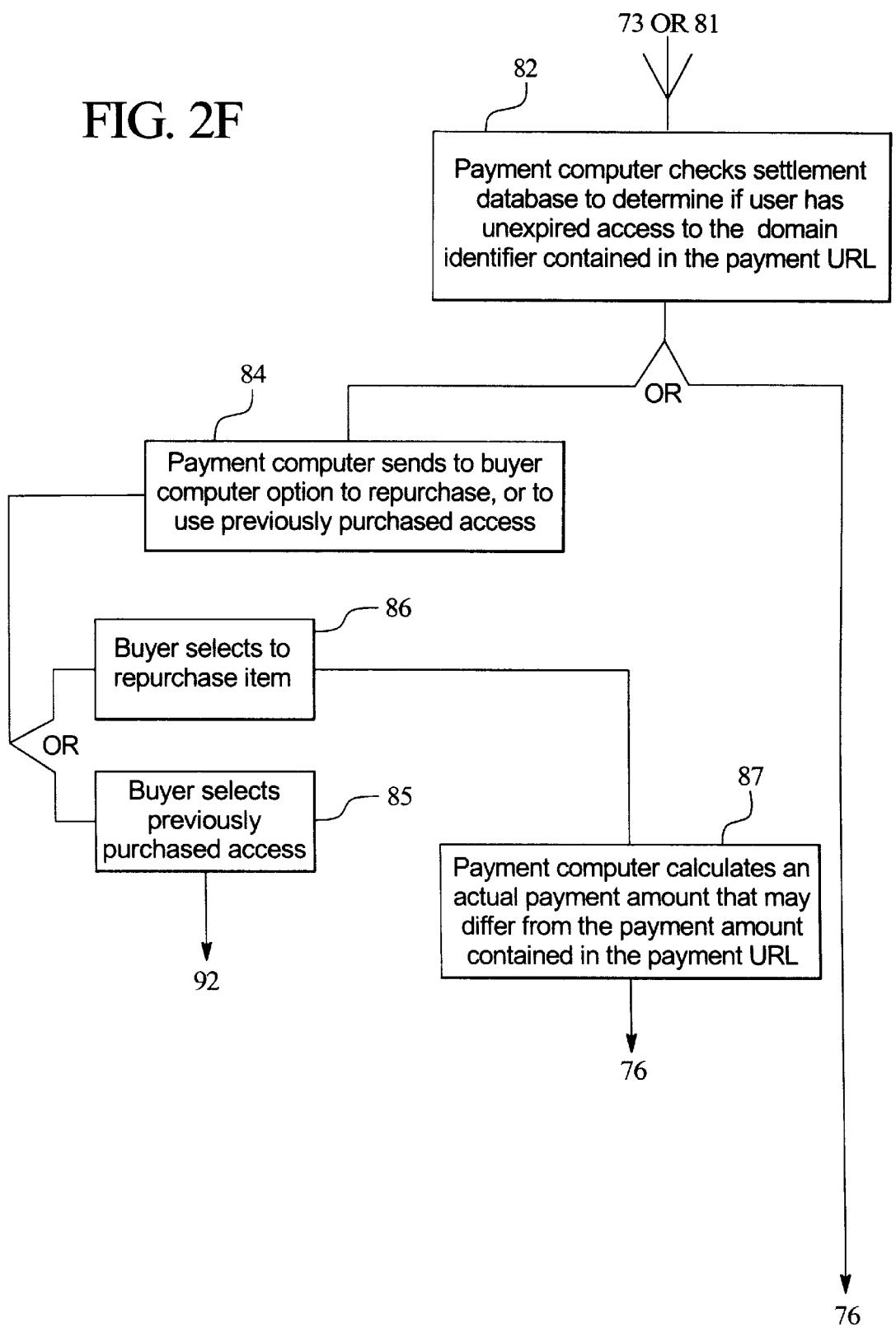

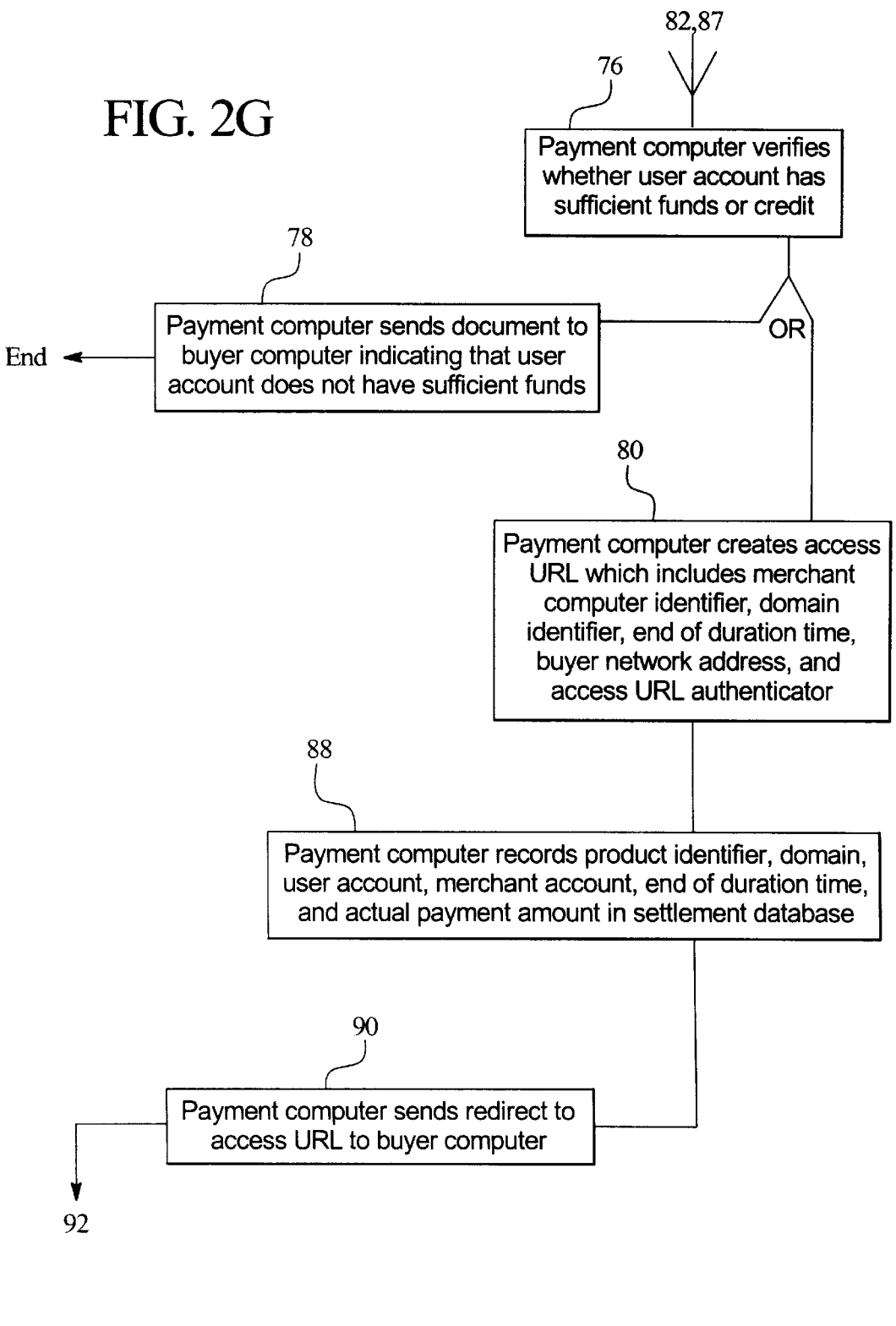

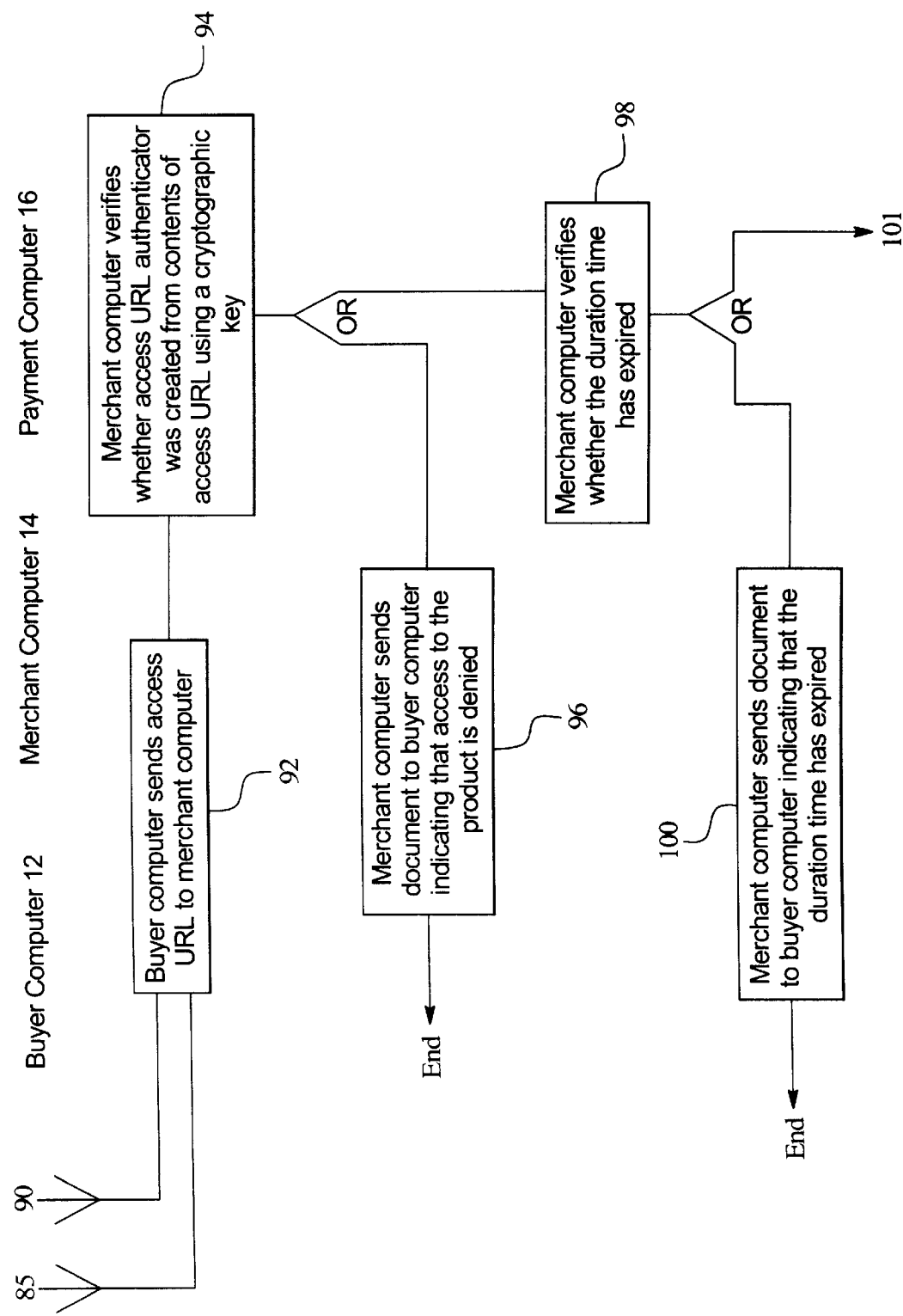

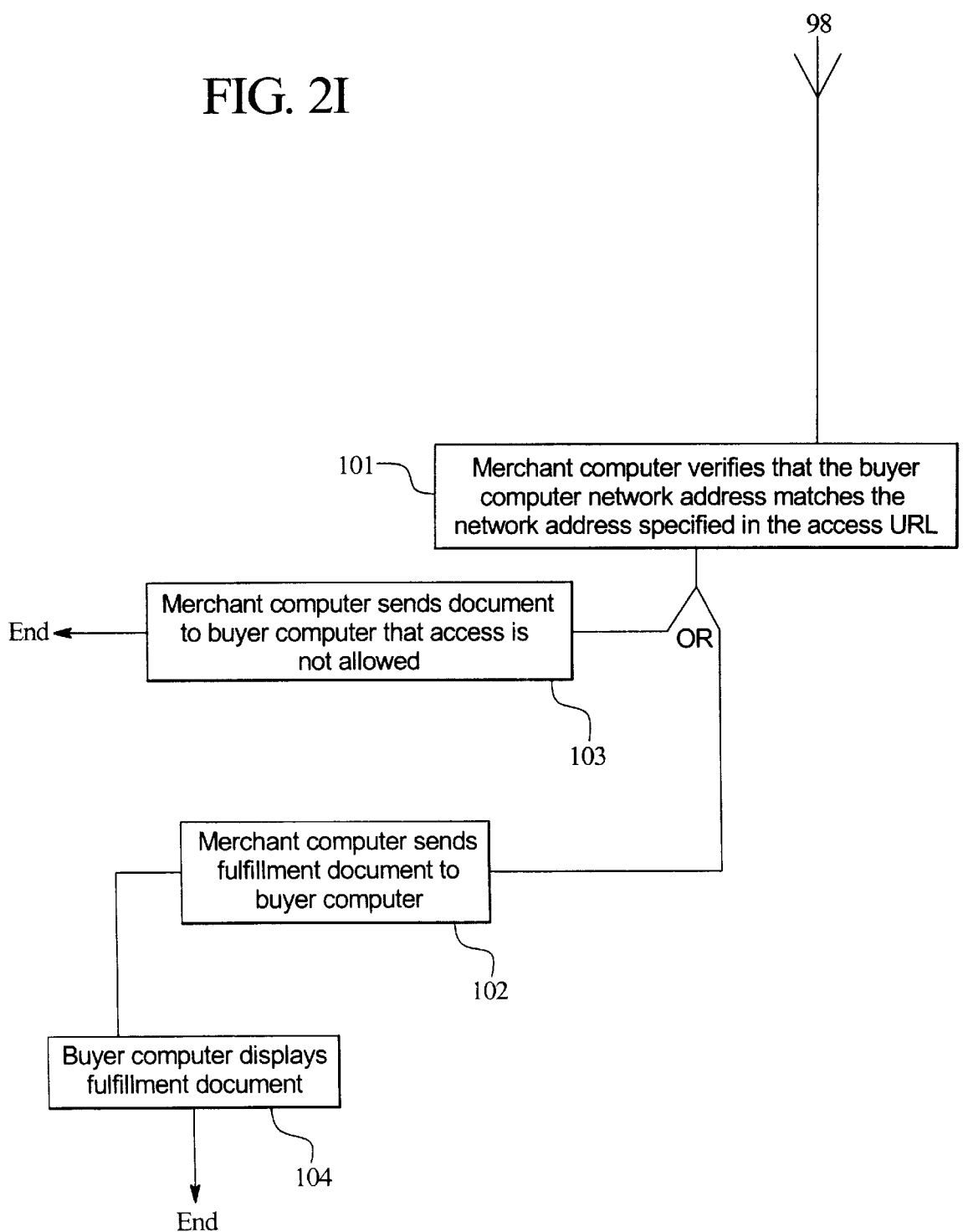

| File | Options | Navigate | Annotate | | Help |

Document Title: Smart Statement for Test User

Document URL: http://payment.openmarket.com/in/nph-stateme

Information about the item.

Transactions in October 1994

```
Mon Oct 3  Test Merchant Dilbert subscription 20 seconds amount $0.10
Tue Oct 4  Test Merchant Mead Data Central Article amount $2.95
Tue Oct 4  Test Merchant Mead Data Central Article amount $2.95
Tue Oct 4  Test Merchant Mead Data Central Article amount $2.95
Tue Oct 4  Test Merchant N.Y. Times Article amount $0.50
Tue Oct 4  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
Wed Oct 5  Test Merchant Mead Data Central Article amount $2.95
```

Your total is 33.05.

Previous Statements

- September 1994
- August 1994

Return to your Newest Statement

Feedback

You can send us comments and suggestions here.

[Back] [Forward] [Home] [Reload] [Open...] [Save As...] [Clone] [New Window] [Close Window]

FIG. 11

NETWORK SALES SYSTEM

CROSS REFERENCE TO RELATED APPLICATION

This is a continuation of U.S. patent application Ser. No. 08/878,396, filed Jun. 18, 1997, now U.S. Pat. No. 5,909,492 which is a continuation of U.S. patent application Ser. No. 08/328,133, filed Oct. 24, 1994 now U.S. Pat. No. 5,715,314.

REFERENCE TO MICROFICHE APPENDICES

Microfiche Appendices A-G are included in parent application Ser. No. 08/328,133, now U.S. Pat. No. 5,715,314.

BACKGROUND OF THE INVENTION

This invention relates to user-interactive network sales systems for implementing an open marketplace for goods or services over computer networks such as the Internet.

U.S. Pat. No. 5,724,424, to David K. Gifford and entitled "Digital Active Advertising," the entire disclosure of which is hereby incorporated herein in its entirety by reference, describes a network sales system that includes a plurality of buyer computers, a plurality of merchant computers, and a payment computer. A user at a buyer computer asks to have advertisements displayed, and the buyer computer requests advertisements from a merchant computer, which sends the advertisements to the buyer computer. The user then requests purchase of an advertised product, and the buyer computer sends a purchase message to the merchant computer. The merchant computer constructs a payment order that it sends to the payment computer, which authorizes the purchase and sends an authorization message to the merchant computer. When the merchant computer receives the authorization message it sends the product to the buyer computer.

The above-mentioned patent application also describes an alternative implementation of the network sales system in which, when the user requests purchase of an advertised product, the buyer computer sends a payment order directly to the payment computer, which sends an directly to the payment computer, which sends an authorization message back to the buyer computer that includes an unforgeable certificate that the payment order is valid. The buyer computer then constructs a purchase message that includes the unforgeable certificate and sends it to the merchant computer. When the merchant computer receives the purchase request it sends the product to the buyer computer, based upon the pre-authorized payment order.

SUMMARY OF THE INVENTION

In one aspect, the invention provides a network-based sales system that includes at least one buyer computer for operation by a user desiring to buy a product, at least one merchant computer, and at least one payment computer. The buyer computer, the merchant computer, and the payment computer are interconnected by a computer network. The buyer computer is programmed to receive a user request for purchasing a product, and to cause a payment message to be sent to the payment computer that comprises a product identifier identifying the product. The payment computer is programmed to receive the payment message, to cause an access message to be created that comprises the product identifier and an access message authenticator based on a cryptographic key, and to cause the access message to be sent to the merchant computer. The merchant computer is programmed to receive the access message, to verify the access message authenticator to ensure that the access message authenticator was created using the cryptographic key, and to cause the product to be sent to the user desiring to buy the product.

The invention provides a simple design architecture for the network sales system that allows the merchant computer to respond to payment orders from the buyer computer without the merchant computer having to communicate directly with the payment computer to ensure that the user is authorized to purchase the product and without the merchant computer having to store information in a database regarding which buyers are authorized to purchase which products. Rather, when the merchant computer receives an access message from the buyer computer identifying a product to be purchased, the merchant computer need only check the access message to ensure that it was created by the payment computer (thereby establishing for the merchant computer that the buyer is authorized to purchase the product), and then the merchant computer can cause the product to be sent to the buyer computer who has been authorized to purchase the product.

In another aspect, the invention features a network-based sales system that includes at least one buyer computer for operation by a user desiring to buy products, at least one shopping cart computer, and a shopping cart database connected to the shopping cart computer. The buyer computer and the shopping cart computer are interconnected by a computer network. The buyer computer is programmed to receive a plurality of requests from a user to add a plurality of respective products to a shopping cart in the shopping cart database, and, in response to the requests to add the products, to send a plurality of respective shopping cart messages to the shopping cart computer each of which includes a product identifier identifying one of the plurality of products. The shopping cart computer is programmed to receive the plurality of shopping cart messages, to modify the shopping cart in the shopping cart database to reflect the plurality of requests to add the plurality of products to the shopping cart, and to cause a payment message associated with the shopping cart to be created. The buyer computer is programmed to receive a request from the user to purchase the plurality of products added to the shopping cart and to cause the payment message to be activated to initiate a payment transaction for the plurality of products added to the shopping cart.

In another aspect, the invention features a network-based link message system that includes at least one client computer for operation by a client user and at least one server computer for operation by a server user. The client computer and the server computer are interconnected by a computer network. The client computer is programmed to send an initial link message to the server computer. The server computer is programmed to receive the initial link message from the client computer and to create, based on information contained in the initial link message, a session link message that encodes a state of interaction between the client computer and the server computer. The session link message includes a session link authenticator, computed by a cryptographic function of the session link contents, for authenticating the session link message. The server computer is programmed to cause the session link message to be sent to the client computer. The client computer is programmed to cause the session link message to be sent to a computer in the network that is programmed to authenticate the session link message by examining the session link authenticator and that is programmed to respond to the session link message based on the state of the interaction between the client computer and the server computer.

In another aspect, the invention features a network-based sales system that includes a merchant database having a plurality of digital advertisements and a plurality of respective product fulfillment items, at least one creation computer for creating the merchant database, and at least one merchant computer for causing the digital advertisements to be transmitted to a user and for causing advertised products to be transmitted to the user. The creation computer and the merchant computer are interconnected by a computer network. The creation computer is programmed to create the merchant database, and to transmit the digital advertisements and the product fulfillment items to the merchant computer. The merchant computer is programmed to receive the digital advertisements and product fulfillment items, to receive a request for a digital advertisement from a user, to cause the digital advertisement to be sent to the user, to receive from the user an access message identifying an advertised product, and to cause the product to be sent to the user in accordance with a product fulfillment item corresponding to the product.

In another aspect, the invention features a hypertext statement system that includes a client computer for operation by a client user and one or more server computers for operation by a server user. The client computer and the server computers are interconnected by a computer network. At least one of the server computers is programmed to record purchase transaction records in a database. Each of the purchase transaction records includes a product description. The server computer is programmed to transmit a statement document that includes the purchase transaction records to the client computer. The client computer is programmed to display the product descriptions, to receive a request from the client user to display a product corresponding to a product description displayed by the client computer, and to cause a product hypertext link derived from a purchase transaction record to be activated. At least one of the server computers is programmed to respond to activation of the product hypertext link by causing the product to be sent to the client computer.

In another aspect, the invention features a network payment system that includes at least one buyer computer for operation by a user desiring to buy a product and at least one payment computer for processing payment messages from the buyer computer. The buyer computer and the payment computer are interconnected by a computer network. The buyer computer is programmed to cause a payment message to be sent to the payment computer. The payment message includes a product identifier identifying the product that the user desires to buy. The payment computer is programmed to receive the payment message, to cause an access message to be created to enable the user to access the product, and to record a purchase transaction record in the settlement database. The buyer computer is programmed to cause a request for purchase transaction records to be sent to the payment computer. The payment computer is programmed to receive the request for purchase transaction records and to cause a document derived from the purchase transaction records to be sent to the buyer computer.

BRIEF DESCRIPTION OF THE DRAWINGS

FIG. 11 is a screen snapshot of a smart statement document that the payment computer sends to the buyer computer in FIG. 4.

DETAILED DESCRIPTION

Figure 1:
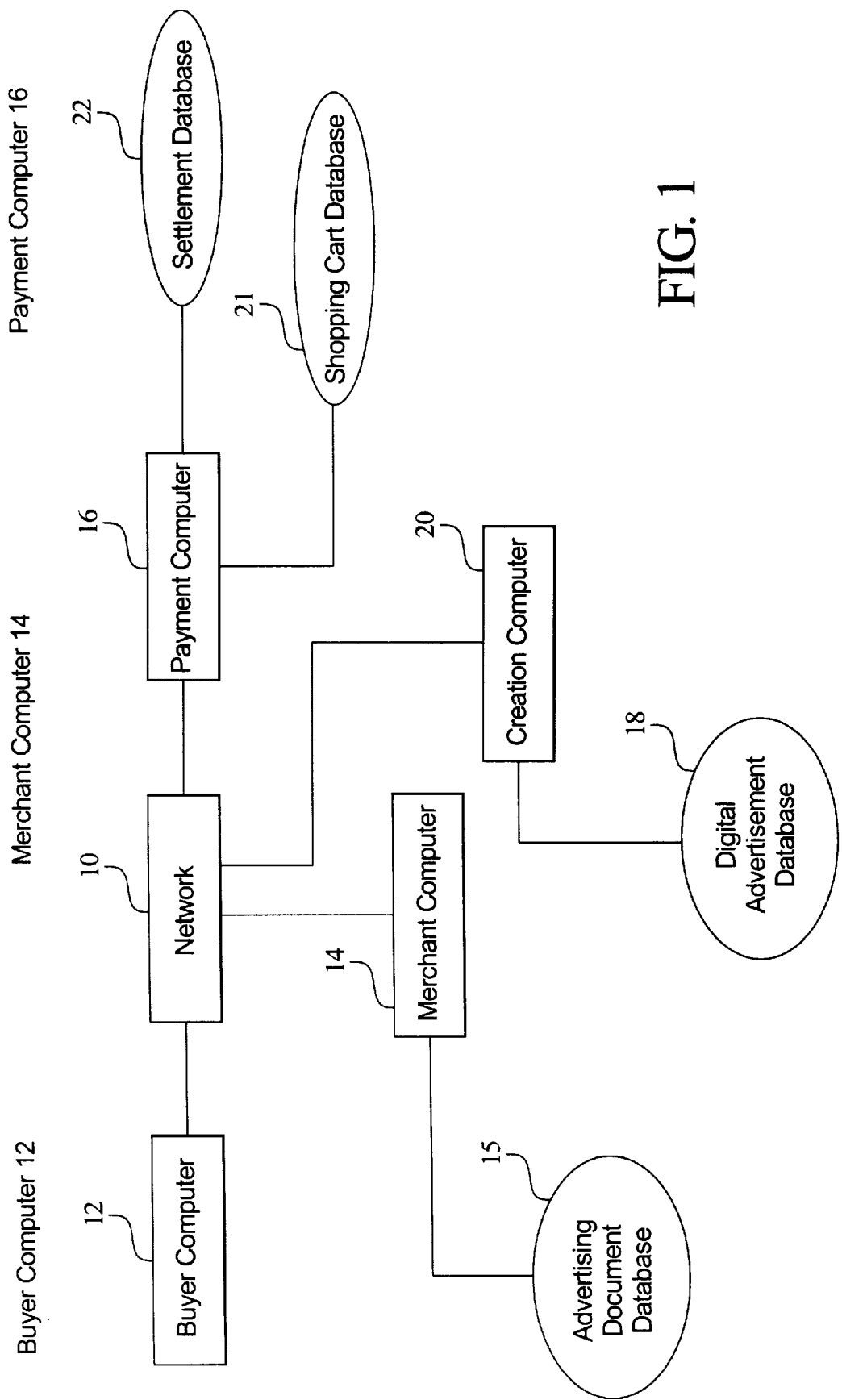
FIG. 1 is a block diagram of a network sales system in accordance with the present invention.

With reference to FIG. 1, a network sales system in accordance with the present invention includes a buyer computer 12 operated by a user desiring to buy a product, a merchant computer 14, which may be operated by a merchant willing to sell products to the buyer or by a manager of the network sales system, a payment computer 16 typically operated by a manager of the network sales system, and a creation computer 20 typically operated by the merchant. The buyer, merchant, payment, and creation computers are all inter-connected by a computer network 10 such as the Internet.

Creation computer 20 is programmed to build a "store" of products for the merchant. A printout of a computer program for use in creating such a "store" in accordance with the present invention is provided as Appendix F.

The products advertised by merchant computer 14 may be, for example, newspaper or newsletter articles available for purchase by buyers. Creation computer 20 creates a digital advertisement database 18 that stores advertising documents (which may for example be in the form of summaries of newspaper or newsletter articles, accompanied by prices) and product fulfillment items (which may be the products themselves if the products can be transmitted over the network, or which may be hard goods identifiers if the products are hard goods, i.e., durable products as opposed to information products). Creation computer 20 transmits contents of the advertising document database 18 to merchant computer 14 to enable the merchant computer to cause advertisements and products to be sent to buyers. Merchant computer 14 maintains advertising documents locally in advertising document database 15. In an alternative embodiment, the creation computer does not have a local digital advertisement database, but instead updates a remote advertising document database on a merchant computer. These updates can be accomplished using HTML forms or other remote database technologies as is understood by practitioners of the art.

Payment computer 16 has access to a settlement database 22 in which payment computer 16 can record details of purchase transactions. The products may be organized into various "domains" of products, and payment computer 16 can access settlement database 22 to record and retrieve records of purchases of products falling within the various domains. Payment computer 16 also has access to a shopping cart database 21 in which a "shopping cart" of products that a user wishes to purchase can be maintained as the user shops prior to actual purchase of the contents of the shopping cart.

Figure 2B:
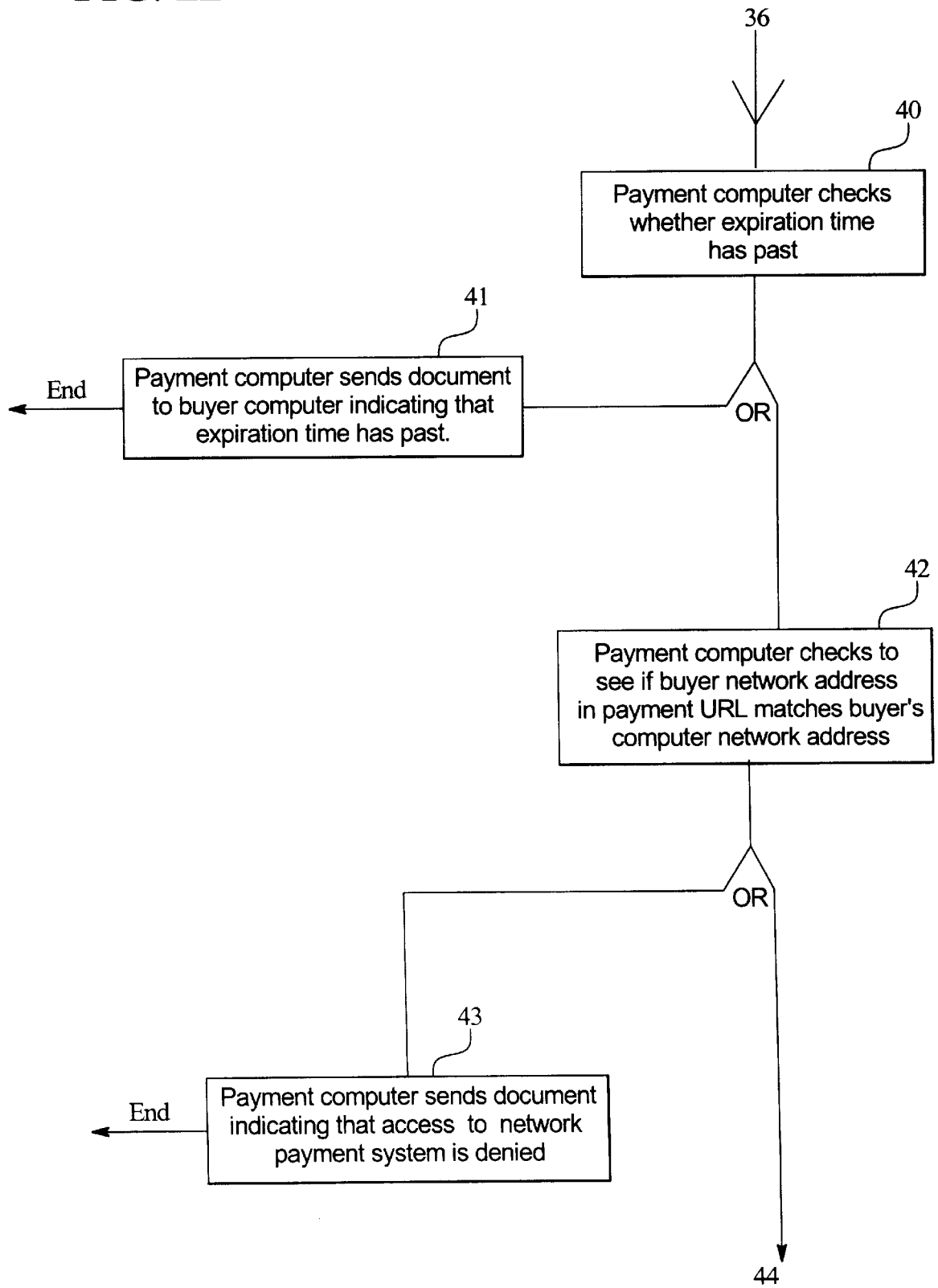
FIG. 2 (2-A through 2-I) is a flowchart diagram illustrating the operation of a purchase transaction in the network sales system of FIG. 1.
Figure 2E:
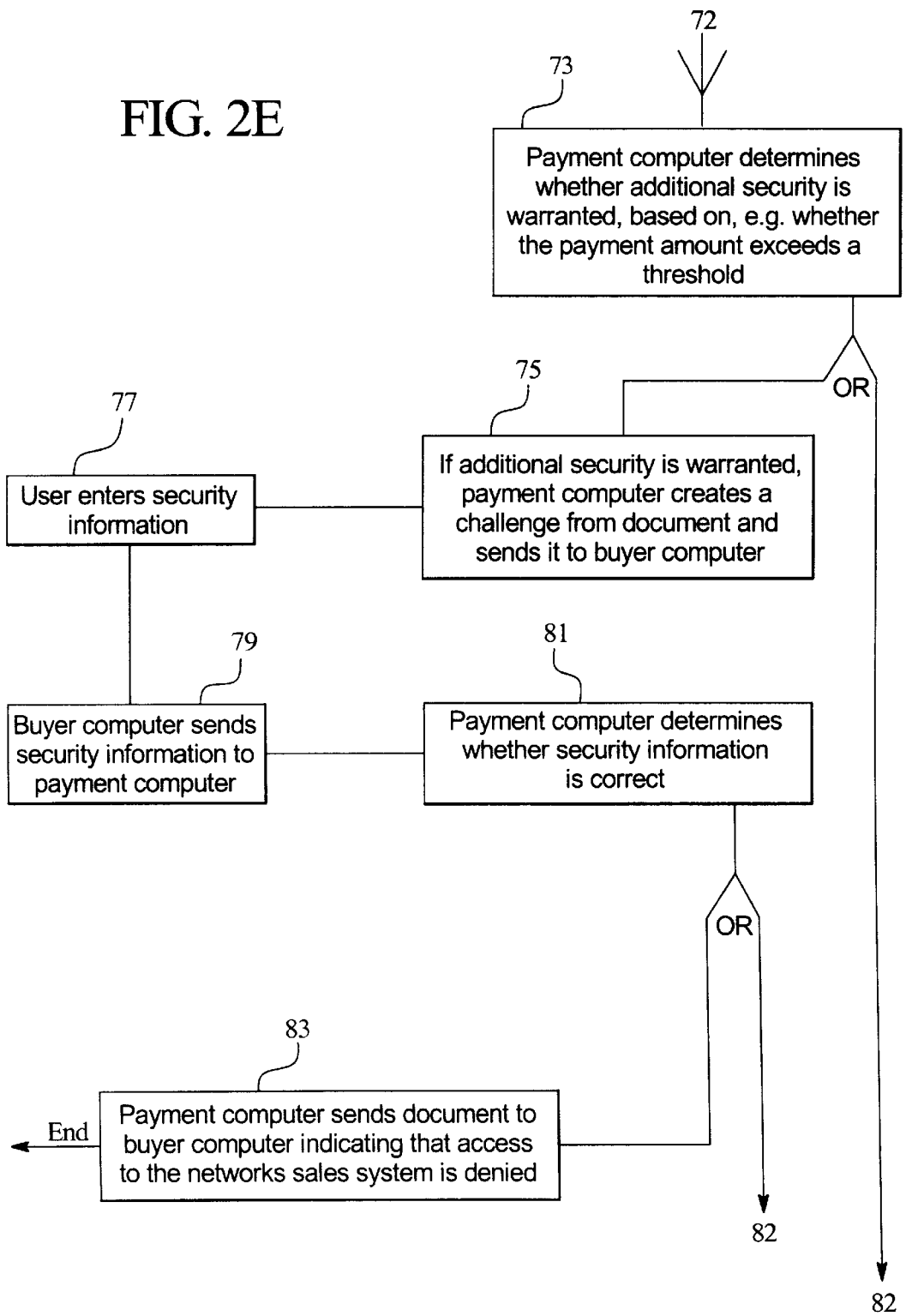
Figure 5:
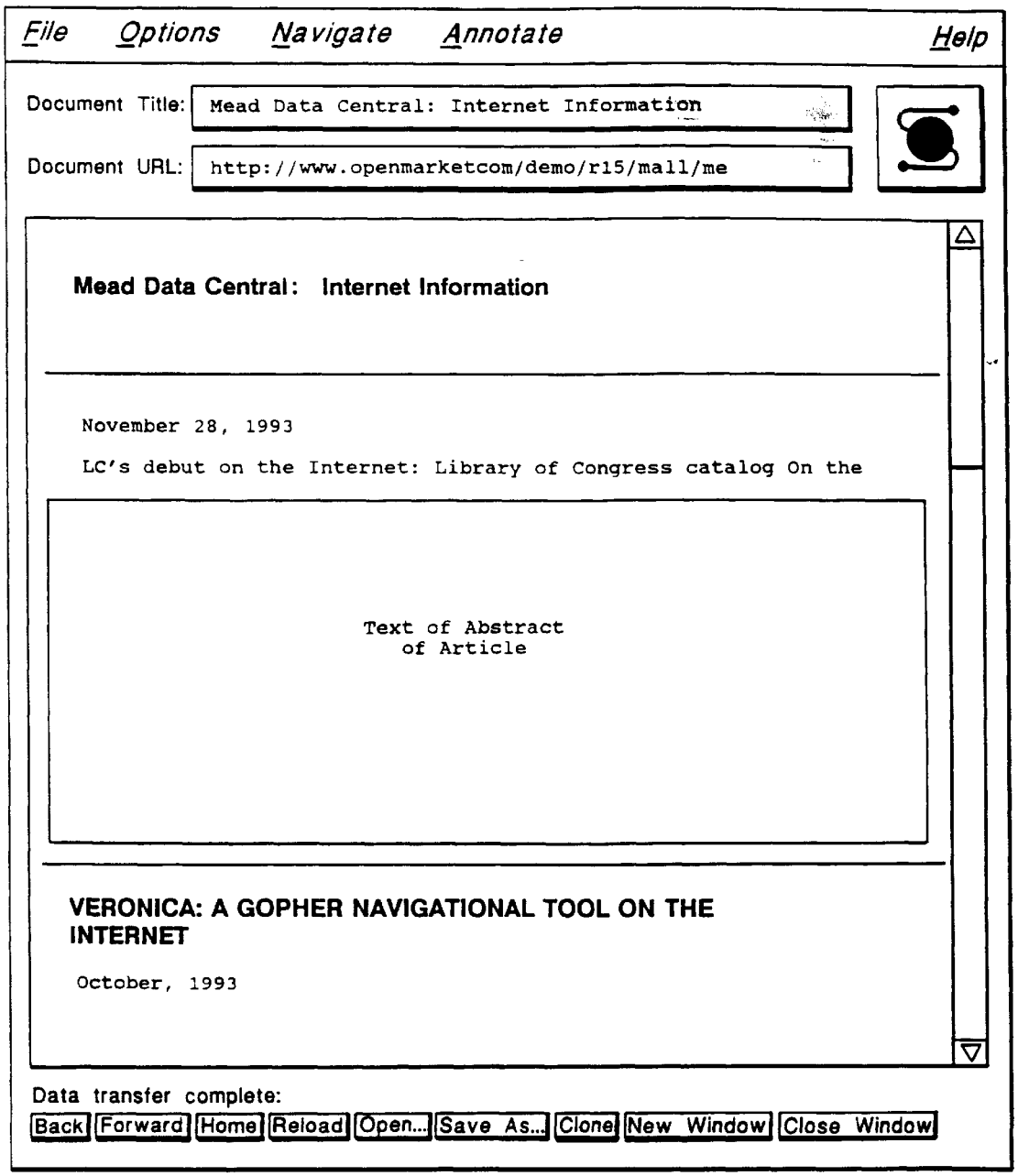
FIG. 5 is a screen snapshot of an advertising document that the merchant computer sends to the buyer computer in FIG. 2.

With reference to FIG. 2, a purchase transaction begins when a user at buyer computer 12 requests advertisements (step 24) and buyer computer 12 accordingly sends an advertising document URL (universal resource locator) to merchant computer 14 (step 26). The merchant computer fetches an advertising document from the advertising document database (step 28) and sends it to the buyer computer (step 30). An example of an advertising document is shown in FIG. 5. Details of URLs and how they are used are found in Appendix G.

The user browses through the advertising document and eventually requests a product (step 32). This results in the buyer computer sending payment URL A to the payment computer (step 34). Payment URL A includes a product identifier that represents the product the user wishes to buy, a domain identifier that represents a domain of products to which the desired product belongs, a payment amount that represents the price of the product, a merchant computer identifier that represents merchant computer 14, a merchant account identifier that represents the particular merchant account to be credited with the payment amount, a duration time that represents the length of time for which access to the product is to be granted to the user after completion of the purchase transaction, an expiration time that represents a deadline beyond which this particular payment URL cannot be used, a buyer network address, and a payment URL authenticator that is a digital signature based on a cryptographic key. The payment URL authenticator is a hash of other information in the payment URL, the hash being defined by a key shared by the merchant and the operator of the payment computer.

In an alternative embodiment, step 34 consists of the buyer computer sending a purchase product message to the merchant computer, and the merchant computer provides payment URL A to the buyer computer in response to the purchase product message. In this alternative embodiment, payment URL A contains the same contents as above. The buyer computer then sends the payment URL A it has received from the merchant computer to the payment computer.

When the payment computer receives the payment URL it verifies whether the payment URL authenticator was created from the contents of the payment URL using the cryptographic key (step 36). If not, the payment computer sends a document to the buyer computer indicating that access to the network sales system is denied (step 38). Otherwise, the payment computer determines whether the expiration time has past (step 40). If it has, the payment computer sends a document to the buyer computer indicating that the time has expired (step 41). Otherwise, the payment computer checks the buyer computer network address to see if it matches the one specified in the payment URL (step 42). If it does not match, the payment computer sends a document to the buyer computer indicating that access to the network payment system is denied (step 43). Otherwise, the payment computer sends a payment confirmation document to the buyer computer, the payment confirmation document including an "open" link and a "continue" link (step 44).

Figure 6:
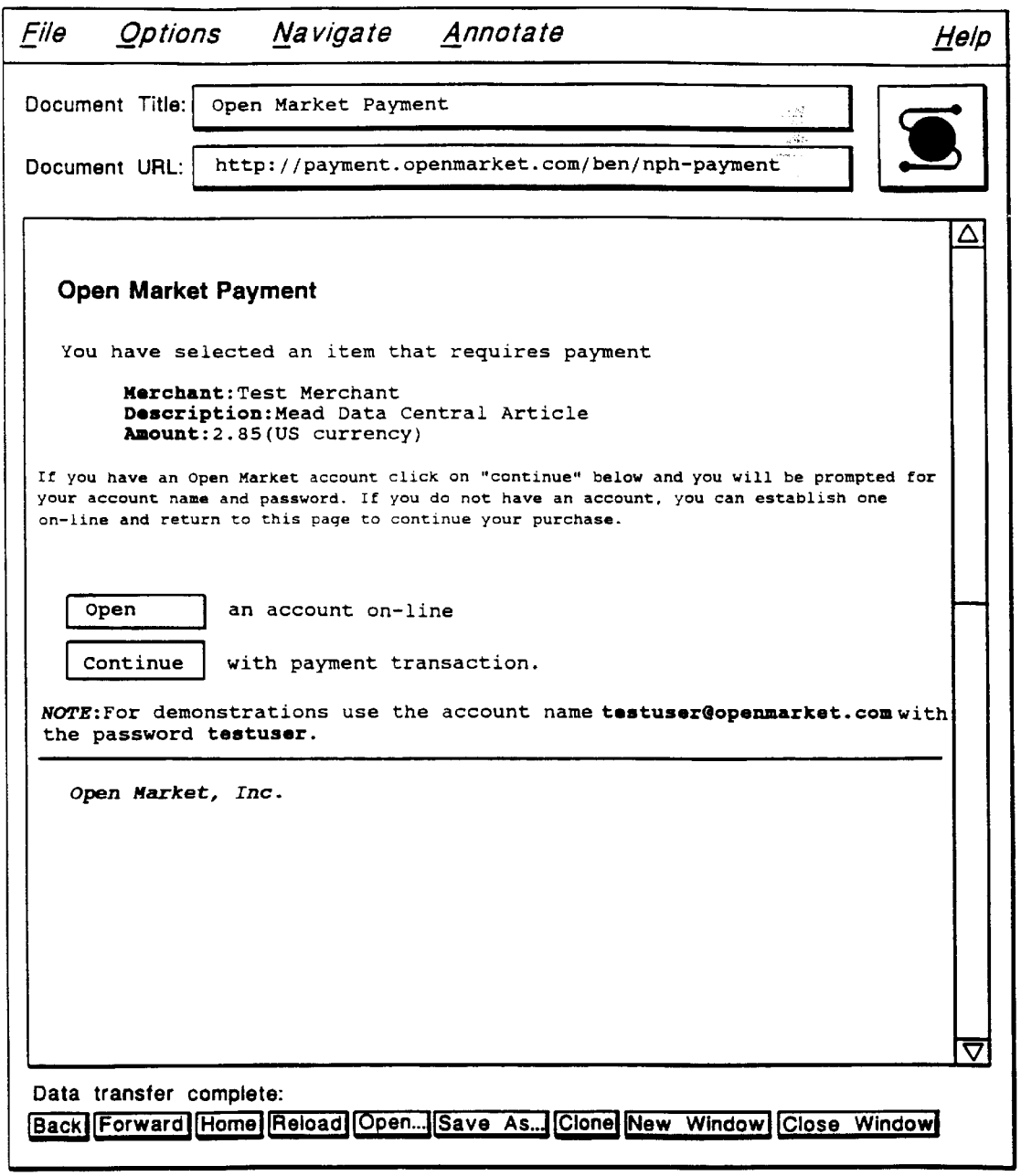
FIG. 6 is a screen snapshot of a confirmation document that the payment computer sends to the buyer computer in FIG. 2.

An example of a confirmation document is shown in FIG. 6. The confirmation document asks the user to click on a "continue" button if the user already has an account with the payment computer, or to click on an "open" button if the user does not already have an account and wishes to open one.

Figure 7:
FIG. 7 is a screen snapshot of a new account document that the payment computer sends to the buyer computer in FIG. 2.

If the user clicks on the "open" button (step 46), the buyer computer sends payment URL C to the payment computer (step 48), payment URL C being similar to payment URL A but also indicating that the user does not yet have an account. The payment computer creates a new account document (step 50) and sends it to the buyer computer (step 52). An example of a new account document is shown in FIG. 7. When the user receives the new account document he enters the new account name, an account password, a credit card number, the credit card expiration date, and security information such as the maiden name of the user's mother (step 54), and presses a "submit" button (not shown in FIG. 7). The buyer computer sends the new account information to the payment computer (step 56), which enters the new account in the settlement database (step 58).

Figure 8:
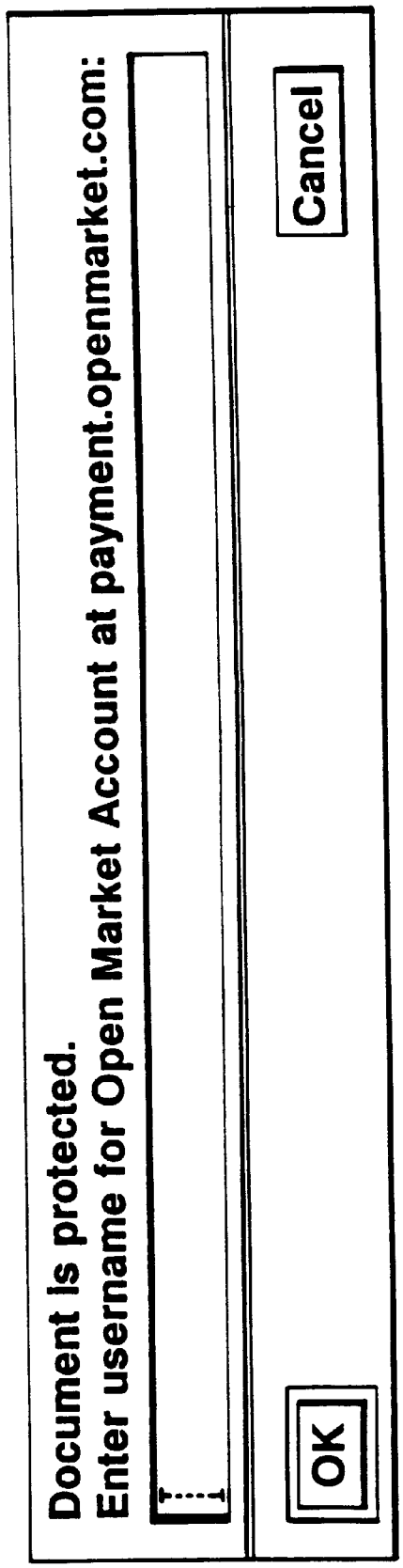
FIG. 8 is a screen snapshot of an account name prompt that the buyer computer creates in FIG. 2.

If the user clicks on the "continue" button (step 60), the buyer computer sends payment URL B to the payment computer (step 62), payment URL B being similar to payment URL A but also indicating that the user already has an account. The payment computer then instructs the buyer computer to provide the account name and password (steps 64 and 66), and the buyer computer prompts the user for this information by creating an account name prompt (example shown in FIG. 8) and a similar password prompt. The user enters the information (step 68) and the buyer computer sends the account name and password to the payment computer (step 70).

The payment computer verifies whether the user name and password are correct (step 72). If they are not correct, the payment computer sends a document to the buyer computer indicating that access to the network sales system is denied (step 74). Otherwise, the payment computer determines whether additional security is warranted, based on, e.g., whether the payment amount exceeds a threshold (step 73). If additional security is warranted, the payment computer creates a challenge form document and sends it to the buyer computer (step 75). The user enters the security information (step 77), the buyer computer sends the security information to the payment computer (step 79), and the payment computer determines whether the security information is correct (step 81). If it is not correct, the payment computer sends a document to the buyer computer indicating that access to the network sales system is denied (step 83).

Figure 9:
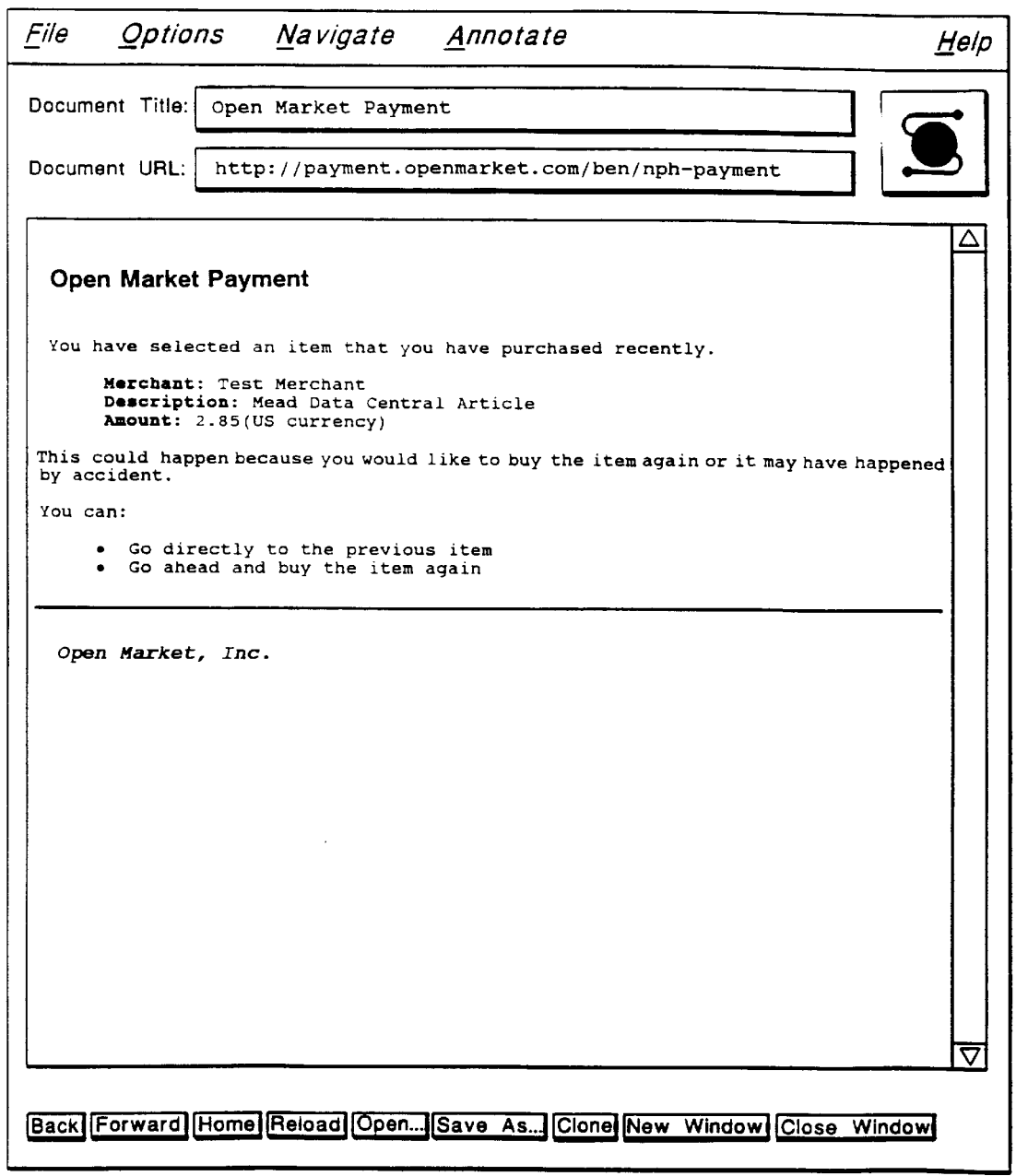
FIG. 9 is a screen snapshot of a document that the payment computer sends to the buyer computer in FIG. 2 and that provides an option either to repurchase or to use a previously purchased access.

If the security information is correct, or if additional security was not warranted, the payment computer checks the settlement database to determine whether the user has unexpired access to the domain identifier contained in the payment URL (step 82). If so, the payment computer sends to the buyer computer a document providing an option either to repurchase or to use the previously purchased access (step 84). An example of such a document is shown in FIG. 9. The user can respond to the recent purchase query document by choosing to access the previously purchased document (step 85) or to go ahead and buy the currently selected product (step 86).

If the user chooses to access the previously purchased document, the buyer computer skips to step 92 (see below). If the user chooses to buy the currently selected product, the payment computer calculates an actual payment amount that may differ from the payment amount contained in the payment URL (step 87). For example, the purchase of a product in a certain domain may entitle the user to access other products in the domain for free or for a reduced price for a given period of time.

The payment computer then verifies whether the user account has sufficient funds or credit (step 76). If not, the payment computer sends a document to the buyer computer indicating that the user account has insufficient funds (step 78). Otherwise, the payment computer creates an access URL (step 80) that includes a merchant computer identifier, a domain identifier, a product identifier, an indication of the end of the duration time for which access to the product is to be granted, the buyer network address, and an access URL authenticator that is a digital signature based on a cryptographic key. The access URL authenticator is a hash of other information in the access URL, the hash being defined by a key shared by the merchant and the operator of the payment computer. The payment computer then records the product identifier, the domain, the user account, the merchant account, the end of duration time, and the actual payment amount in the settlement database (step 88).

The payment computer then sends a redirect to access URL to the buyer computer (step 90), which sends the access URL to the merchant computer (step 92). The merchant computer verifies whether the access URL authenticator was created from the contents of the access URL using the cryptographic key (step 94). If not, the merchant computer sends a document to the buyer computer indicating that access to the product is denied (step 96).

Figure 10:
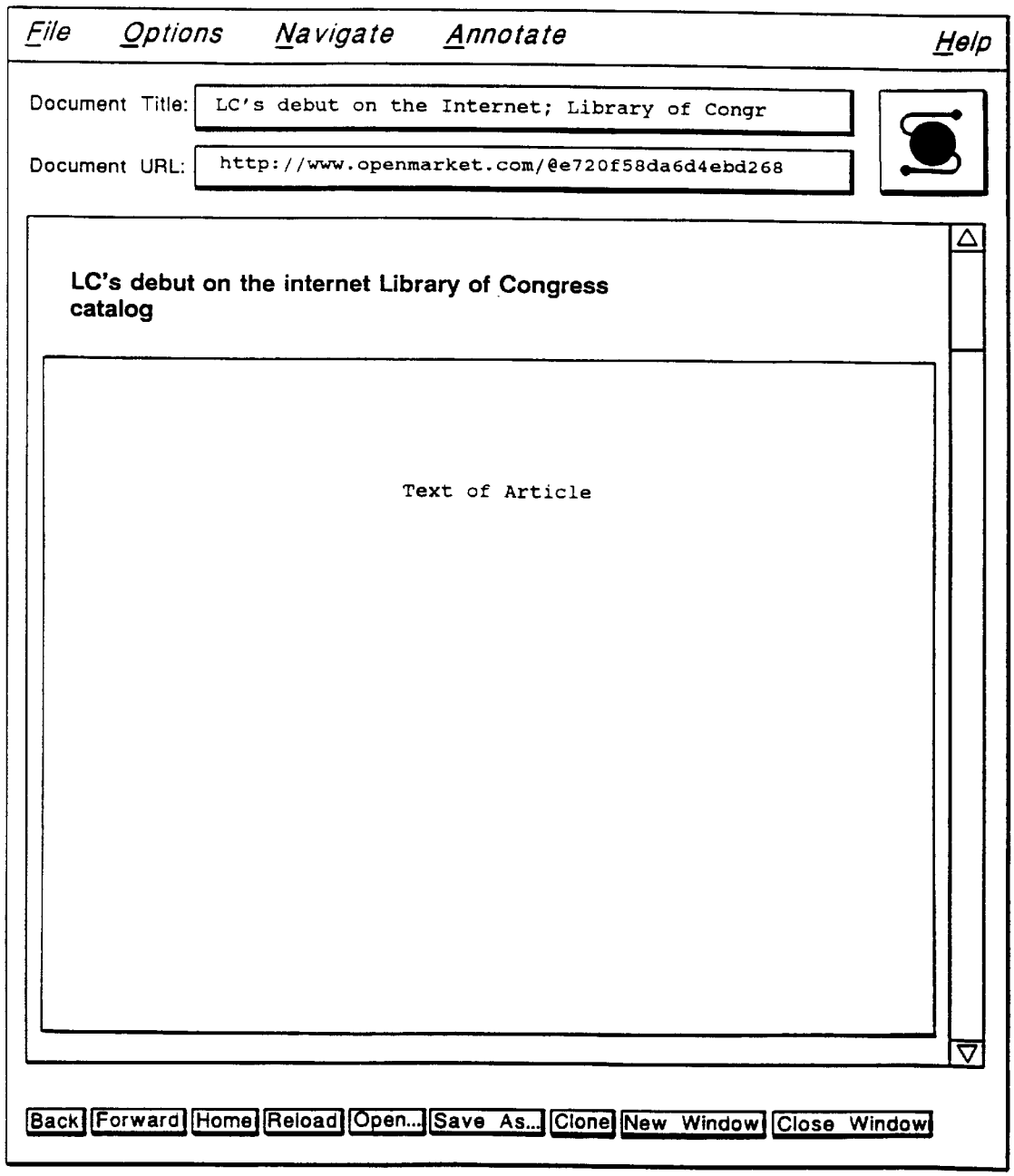
FIG. 10 is a screen snapshot of a fulfillment document that the merchant computer sends to the buyer computer in FIG. 2.

Otherwise, the merchant computer verifies whether the duration time for access to the product has expired (step 98). This is done because the buyer computer can request access to a purchased product repeatedly. If the duration time has expired, the merchant computer sends a document to the buyer computer indicating that the time has expired (step 100). Otherwise the merchant computer verifies that the buyer computer network address is the same as the buyer network address in the access URL (step 101), and if so, sends a fulfillment document to the buyer computer (step 102), which is displayed by the buyer computer (step 104). An example of a fulfillment document is shown in FIG. 10. Otherwise, the merchant computer sends a document to the buyer computer indicating that access is not allowed (step 103).

Figure 3A:
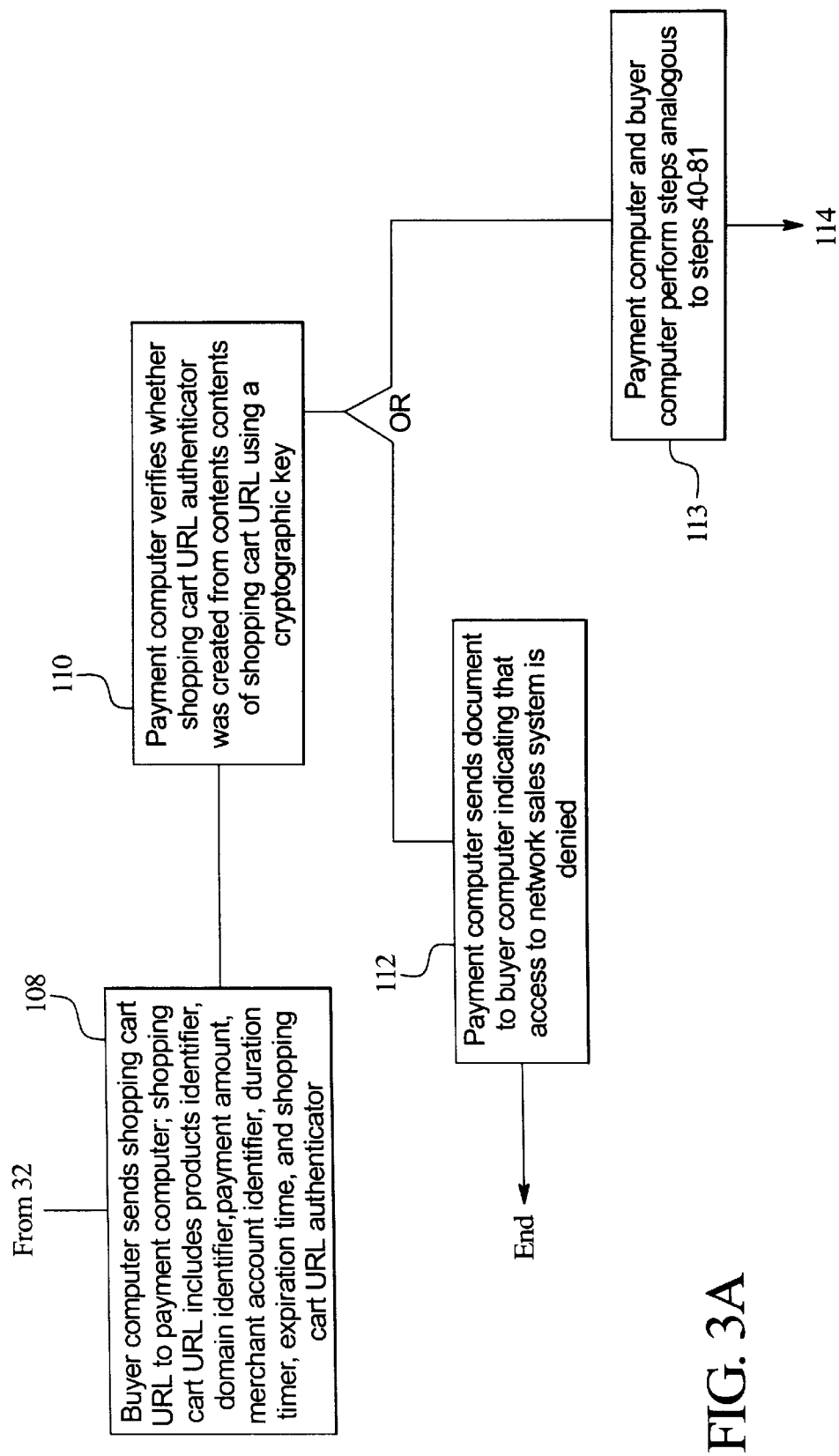
FIG. 3 (3-A through 3-B) is a flowchart diagram illustrating the use of a shopping cart for the purchase of products in connection with the network sales system of FIG. 1.
Figure 3B:
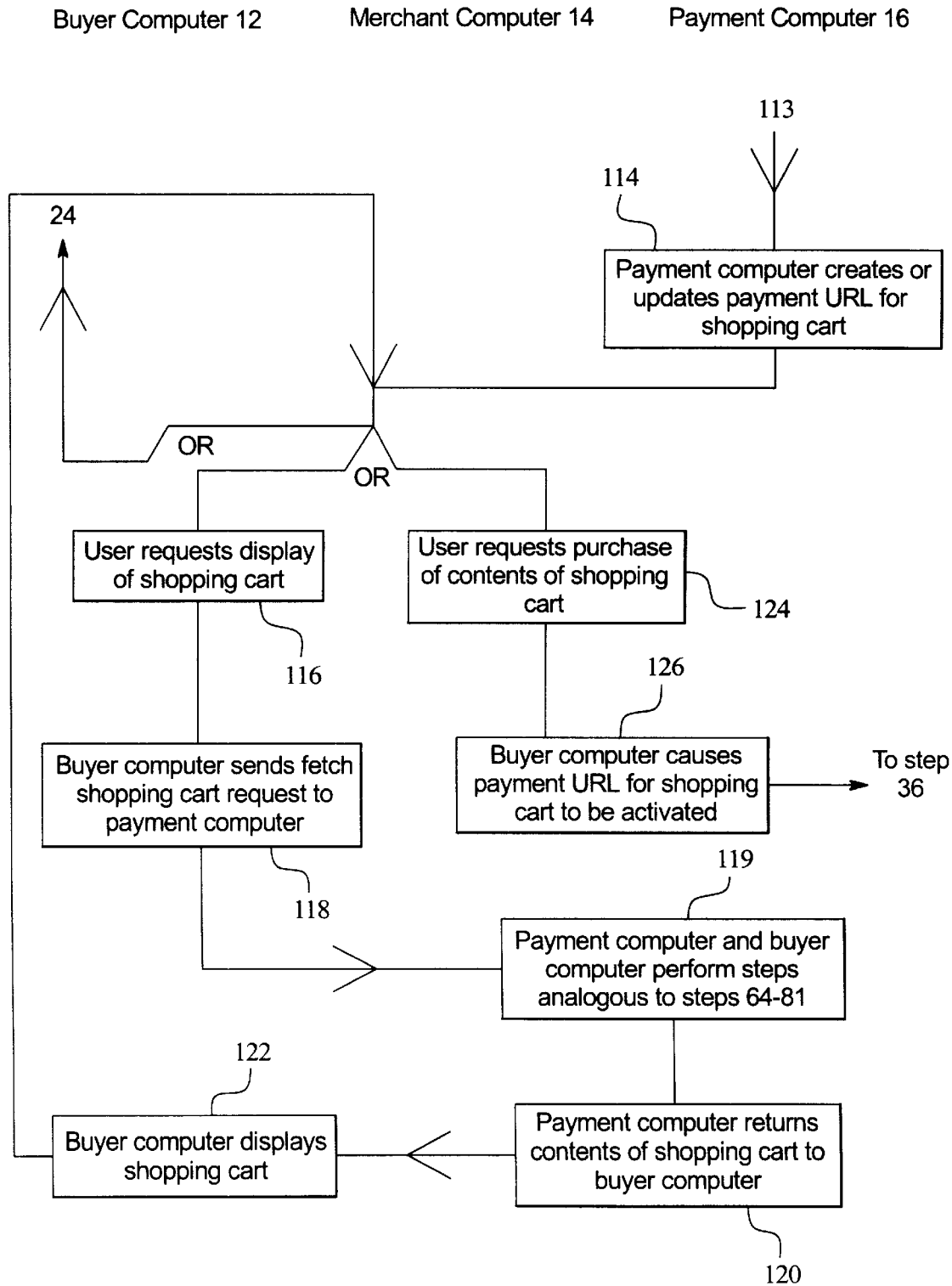

With reference now to FIG. 3, when the merchant computer sends the advertising document to the buyer computer, the user may request that a product be added to a shopping cart in the shopping cart database rather than request that the product be purchased immediately. The buyer computer sends a shopping cart URL to the payment computer (step 108), the shopping cart URL including a product identifier, a domain identifier, a payment amount, a merchant computer identifier, a merchant account identifier, a duration time, an expiration time, and a shopping cart URL authenticator that is a digital signature based on a cryptographic key. The shopping cart URL authenticator is a hash of other information in the shopping cart URL, the hash being defined by a key shared by the merchant and the operator of the payment computer.

The payment computer verifies whether the shopping cart URL authenticator was created from the contents of the shopping cart URL using a cryptographic key (step 110). If not, the payment computer sends a document to the buyer computer indicating that access to the network sales system is denied (step 112). Otherwise, before any modification to a user's shopping cart is allowed, user authentication is performed (step 113) in a manner analogous to steps 40–81. Once the user is authenticated, the payment computer creates or updates a payment URL for the shopping cart (step 114).

The user then either requests more advertisements (step 24 in FIG. 2) and possibly adds another product to the shopping cart, requests display of the shopping cart (step 116), or requests purchase of the entire contents of the shopping cart (step 124). If the user requests display of the shopping cart (step 116), the buyer computer sends a fetch shopping cart request to the payment computer (step 118), and the payment computer and buyer computer (step 119) perform steps analogous to steps 64–81. The payment computer returns the contents of the shopping cart to the buyer computer (step 120), which displays the contents of the shopping cart (step 122). If the user requests that the entire contents of the shopping cart be purchased (step 124) the buyer computer causes the payment URL for the shopping cart to be activated (step 126) and the payment URL is processed in a manner analogous to the processing of payment URLs for individual products (beginning with step 36 in FIG. 2).

Figure 4A:
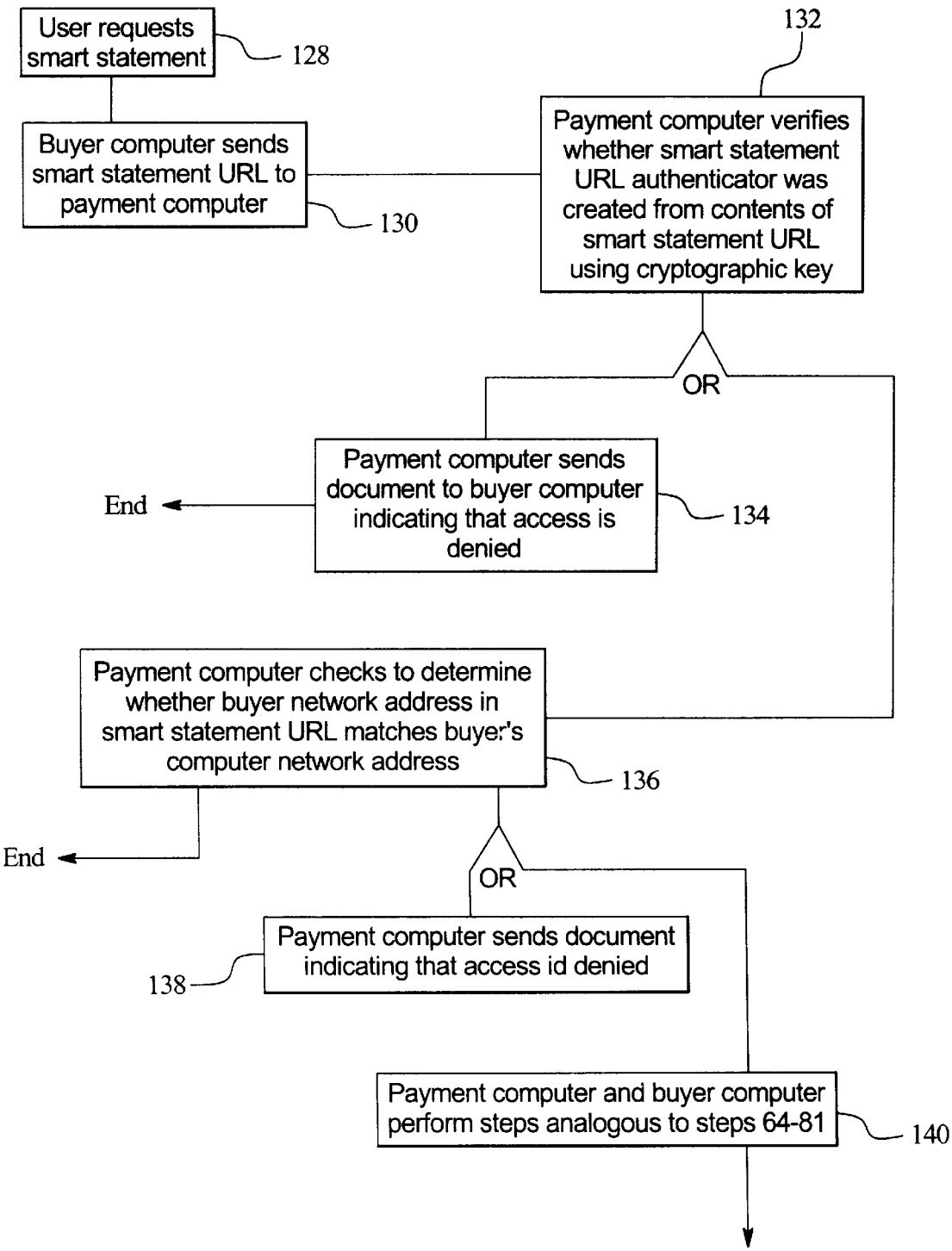
FIG. 4 (4-A through 4-C) is a flowchart diagram illustrating the operation of a smart statement in the network sales system of FIG. 1.
Figure 4B:
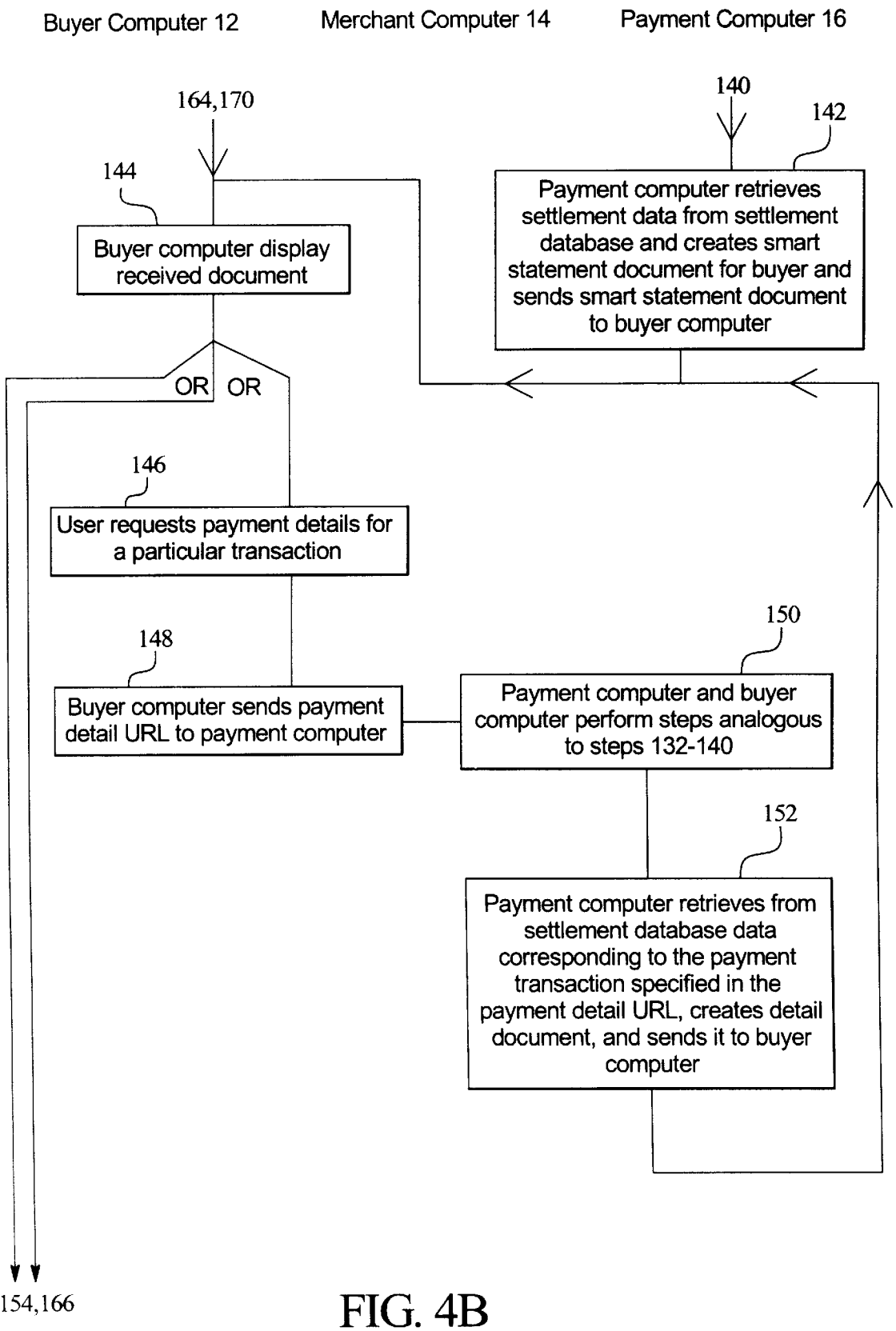
Figure 4C:
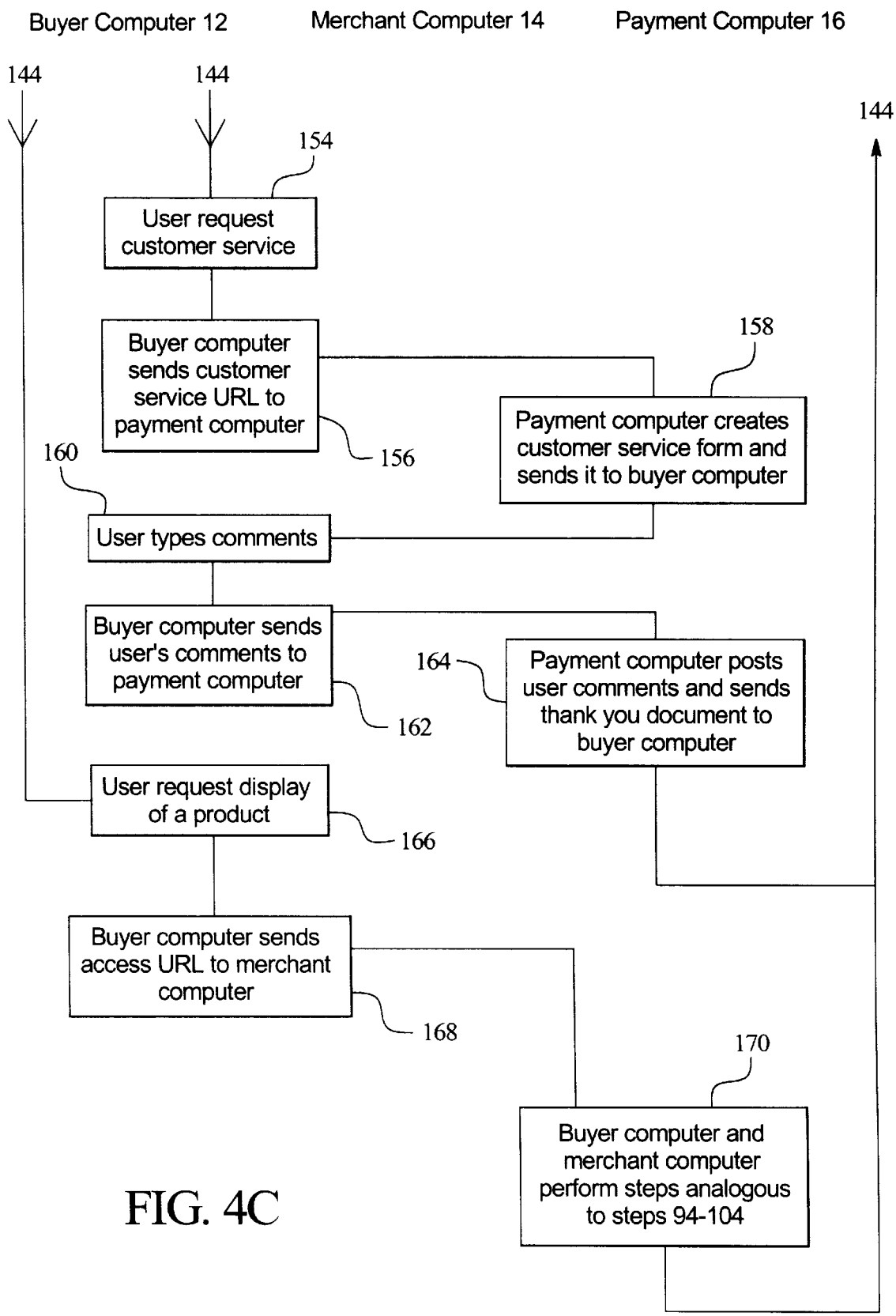

With reference now to FIG. 4, a user can request display of a "smart statement" that lists purchase transactions for a given month (step 128). When the buyer computer receives such a request, it sends a smart statement URL to the payment computer (step 130).

When the payment computer receives the smart statement URL, it verifies whether the smart statement URL authenticator was created from the contents of the smart statement URL using a cryptographic key (step 132). If not, the payment computer sends a document to the buyer computer indicating that access is denied (step 134). Otherwise, the payment computer checks to determine whether the buyer network address in the smart statement URL matches the buyer computer's actual network address (step 136). If not, the payment computer sends a document to the buyer computer indicating that access is denied (step 138). Otherwise (step 140), the payment computer and buyer computer perform a set of steps analogous to steps 64–81 in FIG. 2 (payment computer requests account name and password, user provides the requested information, and payment computer verifies the information).

In an alternative embodiment steps 132–138 are omitted.

After verification of account information is complete, the payment computer retrieves the requested settlement data from the settlement database, creates a smart statement document for the buyer, and sends the smart statement document to the buyer computer (step 142). An example of a smart statement document is shown in FIG. 11. Each purchase transaction record in the smart statement document includes the data of the transaction, the name of the merchant, an identification of the product, and the payment amount for the product. The smart statement document also includes a transaction detail URL for each purchase transaction (these URLs, or hypertext links, are discussed below and are not shown in FIG. 11). The smart statement document also identifies previous statements that the user may wish to have displayed.

The buyer computer displays the retrieved document (step 144), and the user may request transaction details for a particular transaction listed on the smart statement (step 146). If so, the buyer computer sends a transaction detail URL (or "payment detail URL") to the payment computer (step 148). The transaction detail URL includes a transaction identifier, a buyer network address, and a transaction detail URL authenticator. When the payment computer receives the transaction detail URL, it performs (step 150) a set of steps analogous to steps 132–140 (verification of URL authenticator, buyer network address, and account information). The payment computer then retrieves from the settlement database data corresponding to the payment transaction specified in the transaction detail URL, creates a transaction detail document, and sends it to the buyer computer (step 152).

Figure 12:
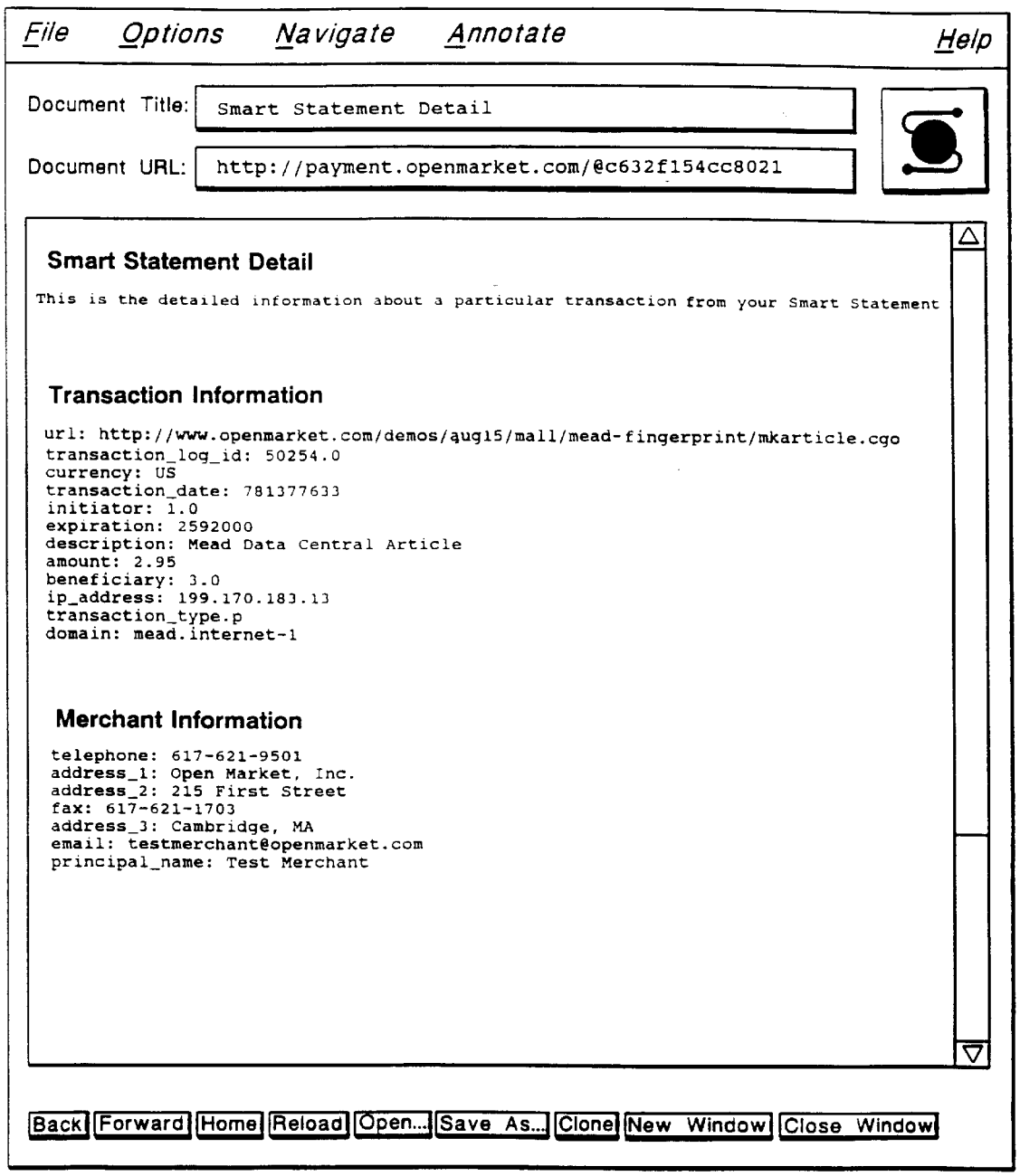
FIGS. 12 and 13 are screen snapshots of a transaction detail document that the payment computer sends to the buyer computer in FIG. 4.
Figure 13:
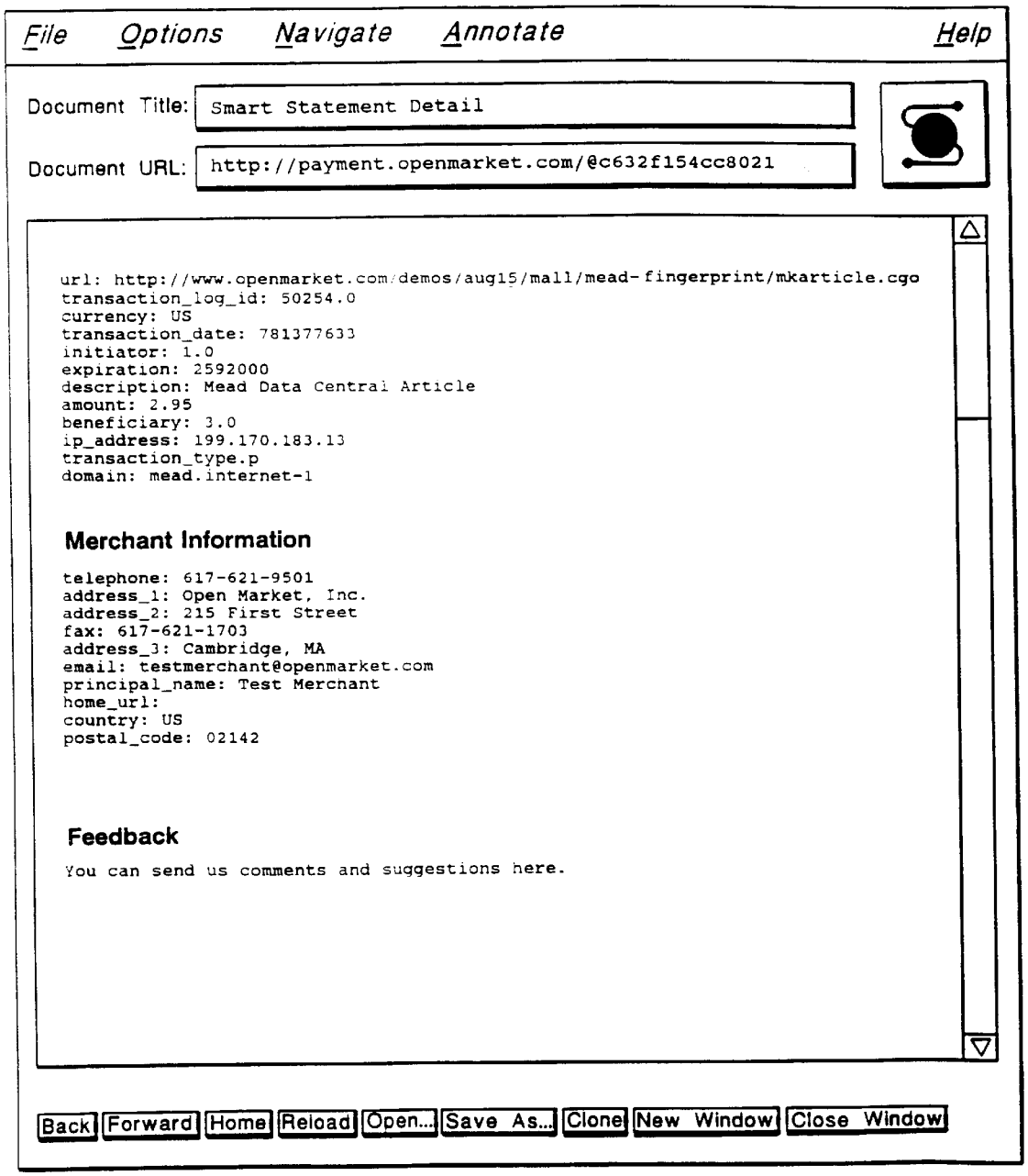

An example of a transaction detail document is shown in FIGS. 12 and 13. The document displays a number of items of information about the transaction, including the transaction date, end of the duration time ("expiration"), a description of the product, the payment amount, the domain corresponding to the product, an identification of the merchant, and the merchant's address.

Figure 14:
FIG. 14 is a screen snapshot of a customer service form that the payment computer sends to the buyer computer in FIG. 4.

The smart statement document and the transaction detail document both include customer service URLs (hypertext links) that allow the user to request customer service (i.e., to send comments and suggestions to the payment computer). When the user requests customer service (step 154), the buyer computer sends the customer service URL to the payment computer (step 156), which creates a customer service form and sends it to the buyer computer (step 158). An example of a customer service form is shown in FIG. 14. The user types comments into the customer service form (step 160), and the buyer computer sends the user's comments to the payment computer (step 162). The payment computer then posts the user comments and sends a thank you document to the buyer computer (step 164).

A user may request display of a produce included in the smart statement. When the user requests that the product be displayed (step 166), the buyer computer sends the access URL contained in the smart statement document to the merchant computer (step 168), and the buyer computer and merchant computer perform a set of steps analogous to steps 94–104 in FIG. 2 (authentication of access URL, verification whether duration time has expired, verification of buyer network address, and transmission of fulfillment document to buyer computer).

Whenever the present application states that one computer sends a URL to another computer, it should be understood that in preferred embodiments the URL is sent in a standard HTTP request message, unless a URL message is specified as a redirection in the present application. The request message includes components of the URL as described by the standard HTTP protocol definition. These URL components in the request message allow the server to provide a response appropriate to the URL. The term "URL" as used the present application is an example of a "link," which is a pointer to another document or form (including multimedia documents, hypertext documents including other links, or audio/video documents).

When the present application states that one computer sends a document to another computer, it should be understood that in preferred embodiments the document is a success HTTP response message with the document in the body of the message. When the present application states that a server sends an account name and password request message to the client, it should be understood that in preferred embodiments the account name and password request message is an unauthorized HTTP response. A client computer sends account name and password information to a server as part of a request message with an authorization field.

The software architecture underlying the particular preferred embodiment is based upon the hypertext conventions of the World Wide Web. Appendix A describes the Hypertext Markup Language (HTML) document format used to represent digital advertisements, Appendix B describes the HTML forms fill out support in Mosaic 2.0, Appendix C is a description of the Hypertext Transfer Protocol (HTTP) between buyer and merchant computers, Appendix D describes how documents are named with Uniform Resource Locators (URLs) in the network of computers, and Appendix E describes the authentication of URLs using digital signatures.

A printout of a computer program for use in creating and operating such a "store" in accordance with the present invention is provided as Appendix F. A printout of a computer program for use in operating other aspects of the network sales system in accordance with the present invention is provided in Appendix G.

There has been described a new and useful network-based sales system. It is apparent that those skilled in the art may make numerous modifications and departures from the specific embodiments described herein without departing from the spirit and scope of the claimed invention.

What is claimed is:

1. A network-based sales system, comprising:
   a merchant database comprising a plurality of digital advertisements and a plurality of respective product fulfillment items;
   at least one creation computer for creating said merchant database; and
   at least one merchant computer for causing said digital advertisements to be transmitted to a user and for causing advertised products to be transmitted to said user;
   said creation computer and said merchant computer being interconnected by a computer network;
   said creation computer being programmed to create said merchant database, and to transmit said digital advertisements and said product fulfillment items to said merchant computer;
   said merchant computer being programmed to receive said digital advertisements and product fulfillment items, to receive a request for a digital advertisement from a user, to cause said digital advertisement to be sent to said user, to receive from said user an access message identifying an advertised product, and to cause said product to be sent to said user in accordance with a product fulfillment item corresponding to said product.

2. A network-based sales system in accordance with claim 1, wherein each of said digital advertisements comprises an abstract of a product and a price.

3. A network-based sales system in accordance with claim 2, wherein:

at least one of said product fulfillment items comprises a product itself; and said creation computer is programmed to transmit said product to said merchant computer with said digital advertisements.

4. A method of processing shopping cart messages sent between a first computer and a second computer, the first computer and the second computer being interconnected by a public packet switched computer network in which communications between the first computer and the second computer are according to hypertext transfer protocol, the method comprising:

at the second computer, receiving from the first computer a shopping cart message, the shopping cart message comprising a universal resource locator that includes at least one identifier incorporated therein pertaining to a respective shopping cart and an authenticator that comprises a digital signature based on a cryptographic key, and examining the shopping cart message at the second computer and returning shopping cart data to the first computer in response to the shopping cart message.

5. The method of claim 4 wherein the first computer is a client computer and the second computer is a server computer.

6. The method of claim 4 wherein the digital signature is a hash of information in the universal resource locator.

7. The method of claim 4 further comprising the step of authenticating the shopping cart message by checking the authenticator.

8. The method of claim 4 wherein the at least one identifier pertaining to the shopping cart comprises a product identifier.

9. The method of claim 4 wherein the at least one identifier of pertaining to the shopping cart comprises a domain identifier.

10. The method of claim 4 wherein the at least one identifier of pertaining to the shopping cart comprises a payment amount.

11. The method of claim 4 wherein the at least one identifier pertaining to the shopping cart comprises a merchant computer identifier.

12. The method of claim 4 wherein the at least one identifier pertaining to the shopping cart comprises a merchant account identifier.

13. The method of claim 4 wherein the at least one identifier pertaining to the shopping cart comprises a duration time.

14. The method of claim 4 wherein the at least one identifier pertaining to the shopping cart comprises an expiration time.

15. The method of claim 4 further comprising receiving at the second computer from the first computerfurther shopping cart messages related to the shopping cart and updating a payment universal resource locator corresponding to the shopping cart in response to the further shopping cart messages.

16. A network-based system for processing shopping cart messages, comprising:

a first computer; and a second computer;

the first computer and the second computer being interconnected by a public packet switched computer network in which communications between the first computer and the second computer are according to hypertext transfer protocol;

the first computer being programmed to transmit a shopping cart message to the second computer, the shopping cart message comprising a universal resource locator that includes at least one identifier incorporated therein pertaining to a respective shopping cart and an authenticator that comprises a digital signature based on a cryptographic key;

the second computer being programmed to examine the shopping cart message at the second computer and to return shopping cart data to the first computer in response to the shopping cart message.

17. The system of claim 16 wherein the first computer is a client computer and the second computer is a server computer.

18. A method of operating a payment computer in a public packet switched computer network comprising at least one buyer computer for operation by a user desiring to buy a product and at least one payment computer, the method comprising:

receiving, at the payment computer, a payment message that the buyer computer has sent to the payment computer for purchasing a product in response to a user request, the payment message comprising a product identifier identifying the product, the payment message comprising a universal resource locator containing all information required by the payment computer for authorizing purchase of the product and an authenticator that comprises a digital signature based on a cryptographic key; and at the payment computer, authorizing, based on the payment message, purchase of the product.

19. The method of claim 18 wherein the digital signature is a hash of information in the universal resource locator.

20. The method of claim 18 further comprising the step of authenticating the payment message by checking the authenticator.

21. A network-based system for processing payment messages, comprising:

a buyer computer; and a payment computer;

the buyer computer and the payment computer being interconnected by a public packet switched computer network;

the buyer computer being programmed to send to the payment computer a payment message for purchasing a product in response to a user request, the payment message comprising a product identifier identifying the product, the payment message comprising a universal resource locator containing all information required by the payment computer for authorizing purchase of the product and an authenticator that comprises a digital signature based on a cryptographic key;

the payment computer being programmed to receive the payment message and to authorize, based on the payment message, purchase of the product.

22. A method of processing shopping cart messages sent between a client computer and a server computer, the client computer and the server computer being interconnected by a public packet switched computer network in which communications between the client computer and the server computer are according to hypertext transfer protocol, the method comprising:

responding to a shopping cart message received from the client computer through the network, by returning to the client computer a hypertext page corresponding to a shopping cart associated with the shopping cart message; and responding to further shopping cart requests related to the shopping cart, the further shopping cart messages being universal resource locators that include at least one identifier incorporated therein pertaining to respective shopping carts and an authenticator that comprises a digital signature based on a cryptographic key, and tracking the further shopping cart requests related to the shopping cart.

23. A network-based system for processing shopping cart messages, comprising:

a client computer; and a server computer;

the client computer and the server computer being interconnected by a public packet-switched computer network in which communications between the client computer and the server computer are according to hypertext transfer protocol;

the client computer being programmed to incorporate into a universal resource locator at least one identifier pertaining to a respective shopping cart;

the server computer being programmed to respond to a shopping cart message received from the client computer through the network, the shopping cart message comprising the universal resource locator, by returning to the client computer a hypertext page corresponding to the shopping cart message; and the server computer being programmed to respond to further shopping cart messages related to the shopping cart, the further shopping cart messages being universal resource locators that include at least one identifier incorporated therein pertaining to respective shopping carts and an authenticator that comprises a digital signature based on a cryptographic key, and to track the further shopping cart messages related to the shopping cart.

* * * * *